(12) United States Patent
Xu

(10) Patent No.: US 11,833,948 B2
(45) Date of Patent: Dec. 5, 2023

(54) RECEIVING DEVICE AND VEHICLE

(71) Applicant: SHANGHAI MAODOUYA AUTOMOTIVE ELECTRONICS CO., LTD., Shanghai (CN)

(72) Inventor: Hechuan Xu, Shanghai (CN)

(73) Assignee: SHANGHAI MAODOUYA AUTOMOTIVE ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 17/948,246

(22) Filed: Sep. 20, 2022

(65) Prior Publication Data

US 2023/0091140 A1    Mar. 23, 2023

(30) Foreign Application Priority Data

Sep. 22, 2021 (CN) .......................... 202122299121.9
Oct. 18, 2021 (CN) .......................... 202122509997.1

(51) Int. Cl.
*A47B 31/06* (2006.01)
*B60N 3/00* (2006.01)

(52) U.S. Cl.
CPC .................................. *B60N 3/002* (2013.01)

(58) Field of Classification Search
CPC ........ A47B 31/06; B60N 3/001; B60N 3/002; B60N 3/005; B60N 2002/905; B60R 7/046; B60R 7/06; B60R 2011/0005–0008; B60R 2011/0057; B60R 2011/0059; B60R 2011/0015; B60R 2011/0017; B60R 11/02

USPC .............. 224/562, 483, 276; 108/44, 45, 47; 248/206.5, 218.4, 309.4
See application file for complete search history.

(56) References Cited

U.S. PATENT DOCUMENTS

| | | | | |
|---|---|---|---|---|
| 1,567,903 | A * | 12/1925 | Bookman | B60N 3/12 206/256 |
| 2,141,849 | A * | 12/1938 | Baer | B62D 1/08 248/447.2 |
| 3,964,612 | A * | 6/1976 | Skilliter, Jr. | B60R 11/02 224/558 |
| 5,387,010 | A * | 2/1995 | Mohr | B42D 17/00 D34/27 |
| 6,386,413 | B1 * | 5/2002 | Twyford | B60R 11/0252 108/138 |
| 2001/0011664 | A1 * | 8/2001 | Meritt | B60R 11/0211 224/929 |
| 2003/0121943 | A1 * | 7/2003 | Chou | B60R 7/084 224/929 |
| 2004/0217615 | A1 | 11/2004 | Lindstrom et al. | |
| 2012/0047711 | A1 * | 3/2012 | Meyer | F16M 11/041 29/525.01 |

(Continued)

FOREIGN PATENT DOCUMENTS

CN    202879366 U    4/2013
CN    202923440 U    5/2013
(Continued)

*Primary Examiner* — Adam J Waggenspack

(57) ABSTRACT

The present disclosure provides a shelf and a vehicle. the shelf is mounted in a vehicle, the vehicle includes a mounting portion, the shelf includes a receiving assembly, the receiving assembly defines a storage space for store objects, the receiving assembly is mounted on the mounting portion. The shelf of the present disclosure can be mounted on the mounting portion of the vehicle, to improve a storage space of the vehicle.

18 Claims, 23 Drawing Sheets

(56) References Cited

U.S. PATENT DOCUMENTS

| | | | |
|---|---|---|---|
| 2014/0151418 A1* | 6/2014 | Yang | B60R 11/02 |
| | | | 224/275 |
| 2015/0217823 A1* | 8/2015 | Willetts | B62K 25/02 |
| | | | 248/218.4 |
| 2016/0003269 A1* | 1/2016 | Russell-Clarke | A44B 11/00 |
| | | | 24/303 |
| 2017/0008434 A1* | 1/2017 | Chang | B60N 2/806 |
| 2020/0062191 A1* | 2/2020 | Ragner | H04B 1/3877 |

FOREIGN PATENT DOCUMENTS

| | | |
|---|---|---|
| CN | 203221937 U | 10/2013 |
| CN | 210502417 U | 5/2020 |
| CN | 210707177 U | 6/2020 |
| KR | 20140011834 A | 1/2014 |

\* cited by examiner

RECEIVING DEVICE AND VEHICLE

CROSS-REFERENCES TO RELATED APPLICATIONS

The present disclosure claims the benefits of Chinese Patent Application No. 202122299121.9, filed on Sep. 22, 2021, and Chinese Patent Application No. 202122509997.1, filed on Oct. 18, 2021, the entire contents of which are incorporated herein for reference.

FIELD

The present disclosure relates to the technical field of vehicles, specifically to a receiving device, and a vehicle applying the receiving device.

BACKGROUND

With the development of the times, car has become a necessity for people. The storage space in the car is small, so it is necessary to arrange a shelf in the car.

SUMMARY

The present disclosure provides a receiving device which can provide a storage space for storing objects.

The receiving device can be mounted in a vehicle, the vehicle includes a mounting portion, the receiving device includes a receiving assembly defining a storage space for storing objects, the receiving assembly is mounted on the mounting portion.

In at least one embodiment, the mounting portion includes a front panel, the receiving assembly is mounted on the front panel by at least one connecting member; or the mounting portion includes a front panel and a display panel opposite to the front panel, the receiving assembly is mounted on the front panel and clamped between the front panel and the display panel; or the mounting portion includes a front panel and a connecting beam connected with the front panel, the receiving assembly includes a first clamping member defining a clamping space, the receiving assembly is mounted on the front panel, and the connecting beam is clamped in the clamping space; or the mounting portion includes a front panel, a display panel, and a connecting beam connected between the front panel and the display panel, the receiving assembly includes a first clamping member defining a clamping space, the receiving assembly is mounted on the front panel and clamped between the front panel and the display panel, and the connecting beam is clamped in the clamping space.

In at least one embodiment, the receiving device further includes a first magnetic member for magnetically adsorbing a magnetic element, a wall of the storage space defines a third receiving groove, the first magnetic member is received in the third receiving groove; and/or the receiving assembly further includes a first bottom wall and at least one side wing connected with the first bottom wall, the mounting portion includes a front panel, the first bottom wall is mounted on the front panel, and the side wing includes a curved surface, the curved surface is matched with the front panel in shape, the curved surface is abutted against the front panel when the receiving assembly is mounted on the front panel.

In at least one embodiment, the receiving device further includes a fixing assembly detachably connected with the receiving assembly, the fixing assembly and the receiving assembly cooperatively define a mounting space, the mounting portion includes a connecting beam, the connecting beam is received in the mounting space, so as to mount the receiving device on the connecting beam.

In at least one embodiment, the receiving assembly includes two first connecting members; and the fixing assembly includes two second connecting members, the first connecting members are detachably connected with the second connecting members to detachably connect the receiving assembly with the fixing assembly.

In at least one embodiment, each of the first connecting members defines a first receiving groove; each of the second connecting members defines a second receiving groove; and the receiving device further includes two second magnetic members respectively received in the first receiving grooves, and two third magnetic members respectively received in the second receiving grooves, the first connecting member is detachably connected with the second connecting member by a magnetic force between the second magnetic member and the third magnetic member, the magnetic force between the second magnetic member and the third magnetic member has a range of 300~600 mT.

In at least one embodiment, one of the first connecting member and the second connecting member is protruded with a second clamping member, another one of the first connecting member and the second connecting member defines a clamping groove, the second clamping member is detachably clamped in the clamping groove; or one of the first connecting member and the second connecting member is protruded with a screw rod, another one of the first connecting member and the second connecting member defines a screw hole, the screw rod is detachably received in the screw hole; or the first connecting member defines a first positioning hole, the second connecting member defines a second positioning hole, the first positioning hole is communicated with the second connecting hole when the first connecting member is connected with the second connecting member.

In at least one embodiment, the receiving member includes a first bottom wall connected with the first connecting members, and at least one first side wall connected with the first bottom wall, the first bottom wall and the first side wall cooperatively define the storage space, the first bottom wall, the first connecting members, and the fixing assembly cooperatively define the mounting space.

In at least one embodiment, the mounting portion further includes a front panel, the connecting beam is arranged on the front panel, the receiving member further includes at least one side wing connected with the first bottom wall, the side wing includes a curved surface, the curved surface is matched with the front panel in shape, the curved surface is abutted against the front panel when the connecting beam is received in the mounting space.

In at least one embodiment, a quantity of the at least one first side wall is more than one, an angle between one of the at least one first side wall and the first bottom wall is greater than 90°; and/or one first side wall of the at least one first side wall is arc-shaped.

In at least one embodiment, the fixing assembly further includes: a retaining member configured to retain against the connecting beam when the connecting beam is received in the mounting space.

In at least one embodiment, the fixing member further include a first storage box connected with the second connecting members, the first storage box, the second connecting members, and the receiving assembly cooperatively define the mounting space, the first storage box defines at least one opening for placing objects in the first storage box or taking objects out of the first storage box.

In at least one embodiment, the first storage box includes a second side wall and a third side wall connected with the second side wall, the second connecting members are connected with the second side wall and/or the third side wall, the second side wall defines a first opening for placing objects in the first storage box or taking objects out of the first storage box, the third side wall defines a second opening for placing objects in the first storage box.

In at least one embodiment, the first storage box further includes a second bottom wall connected with the second side wall and the third side wall, the second bottom wall defines a third opening, the first opening is narrow and long, the first opening is configured to facilitate taking paper towels.

In at least one embodiment, the first storage box further includes a fourth side wall connected between the third side wall and the second bottom wall.

In at least one embodiment, the fourth side wall defines a fourth opening communicated with the second opening; and/or the first storage box further includes at least one fifth side wall, the fifth side wall is connected between the third side wall, the second bottom wall, and the fourth side wall; and/or the second bottom wall is protruded with at least one reinforcing rib; and/or the second bottom wall defines at lease one receiving groove, the first storage box further includes at least one fourth magnetic member received in the receiving groove, the fourth magnetic member is configured for magnetically adsorbing an electronic device.

In at least one embodiment, the first storage box further includes a receiving cavity and a drawer received in the receiving cavity in a drawable manner by the first opening.

In at least one embodiment, the receiving device further includes a second storage box communicated with the first storage box, one side of the second storage box is rotatably connected with the first storage box, and another side of the second storage box is detachably connected with the first storage box.

In at least one embodiment, the receiving device further includes a second storage box communicated with the first storage box and having a third bottom wall, the third bottom wall defines a fifth opening, the second storage box includes a supporting element arranged on the third bottom wall, the supporting element is configured to support objects in the second storage box and divide the fifth opening into two sub-openings, the sub-openings is configured to facilitate taking wet tissues.

In at least one embodiment, the mounting portion includes a front panel and a connecting beam connected with the front panel, the receiving assembly further includes: a first bottom wall, and two side wings arranged on the first bottom wall and matched with the front panel in shape, the side wing includes a curved surface, the curved surface is matched with the front panel in shape, when the receiving assembly is mounted on the mounting portion, the first bottom wall is mounted on the front panel, the curved surface is abutted against the front panel, and the connecting beam is clamped between free ends of the side wings; or the receiving assembly further includes: a first bottom wall, and a receiving portion arranged on the first bottom wall and matched with the connecting beam in shape, when the receiving assembly is mounted on the mounting portion, the first bottom wall is mounted on the front panel, the receiving assembly is mounted on the connecting beam by a connecting member; or the receiving assembly further includes a first bottom wall, two side wings arranged on the first bottom wall and matched with the front panel in shape, and a receiving portion arranged on the first bottom wall and matched with the connecting beam in shape, the side wing includes a curved surface, the curved surface is matched with the front panel in shape, the side wings and the receiving portion cooperatively from a mounting space, when the receiving assembly is mounted on the mounting portion, the first bottom wall is mounted on the front panel, the curved surface is abutted against the front panel, the receiving assembly is mounted on the connecting beam by a connecting member, and the connecting beam is mounted in the mounting space.

The present disclosure further provides a vehicle, which includes a mounting portion and the receiving device as described above.

In the technical solution of the present disclosure, the receiving device includes a receiving assembly having a storage space for storing objects and a fixing assembly. The fixing assembly is detachably connected with the receiving assembly, the fixing assembly and the receiving assembly cooperatively define a mounting space, the mounting portion is received in the mounting space, so as to mount the receiving device on the mounting portion. The receiving device of the present disclosure can be mounted on the mounting portion of the vehicle, to improve a storage space of the vehicle.

BRIEF DESCRIPTION OF THE DRAWINGS

Implementations of the present disclosure will now be described, by way of embodiment, with reference to the attached FIG.s. It should be understood, the drawings are shown for illustrative purpose only, for ordinary person skilled in the art, other drawings obtained from these drawings without paying creative labor by an ordinary person skilled in the art should be within scope of the present disclosure.

Figure 1:
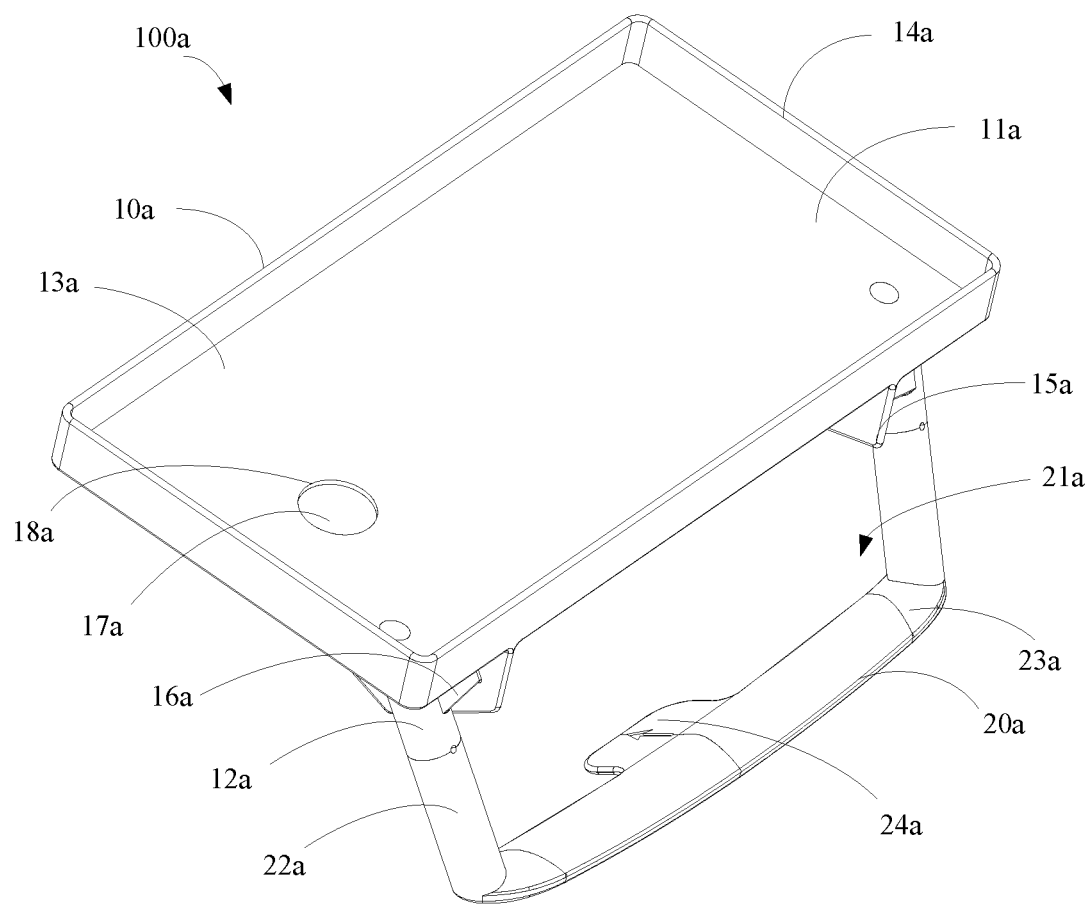
FIG. 1 is a structure diagram of a receiving device according to a first embodiment of the present disclosure.

The realization of the aim, functional characteristics, advantages of the present disclosure are further described specifically with reference to the accompanying drawings and embodiments.

DETAILED DESCRIPTION

It will be appreciated that for simplicity and clarity of illustration, where appropriate, reference numerals have been repeated among the different FIG.s to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion in the so-described combination, group, series, and the like. the present disclosure is illustrated by way of example and not by way of limitation in the FIG.s of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Figure 2:
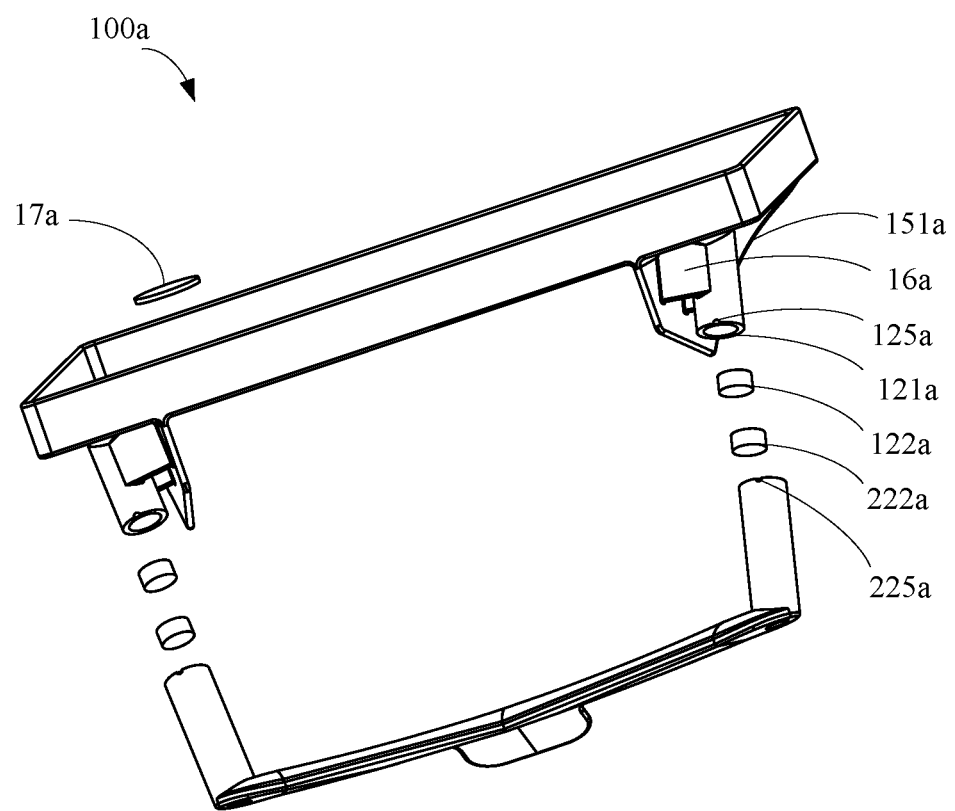
FIG. 2 is an exploded view of the receiving device of FIG. 1.
Figure 3:
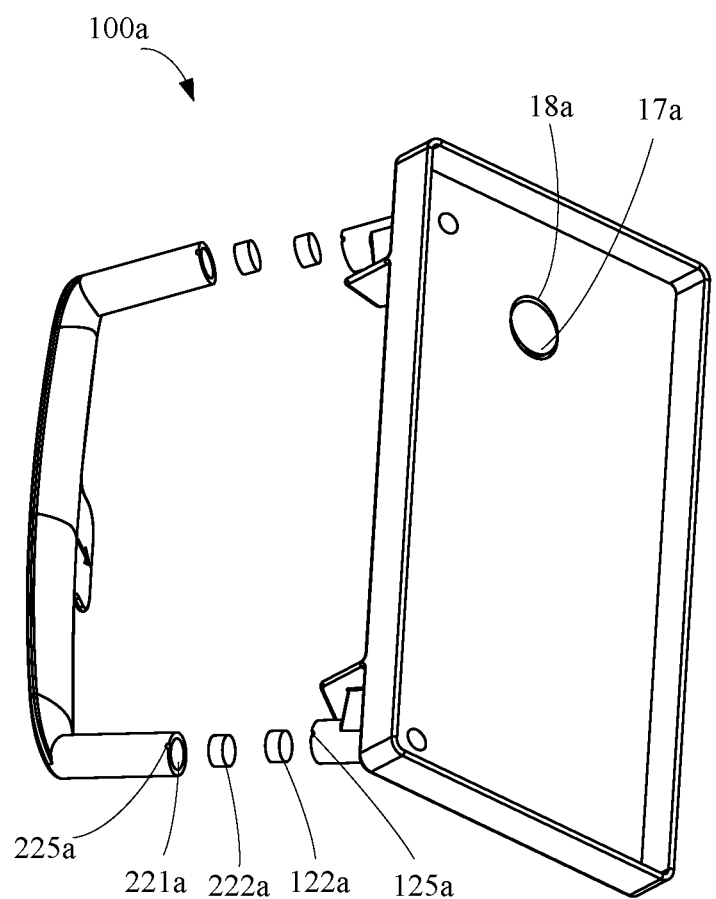
FIG. 3 is similar to FIG. 2, but shown from another view.

Please referring to FIGS. 1 to 3, the present disclosure provides a receiving device 100a according to a first embodiment. The receiving device 100a can be mounted on a mounting portion 201 of a vehicle 200.

The receiving device 100a includes a receiving assembly 10a and a fixing assembly 20a detachably connected with the receiving assembly 10a. The receiving assembly 10a defines a storage space 11a for storing objects. The fixing assembly 20a and the receiving assembly 10a cooperatively define a mounting space 21a, the mounting portion 201 includes a connecting beam 2013, the connecting beam 2013 is received in the mounting space 21a, so as to mount the receiving device 100a on the mounting portion 201.

In at least one embodiment, the receiving assembly 10a can be made of plastic, silicone, rubber, metal, wood, or the like.

In at least one embodiment, the receiving member 10a includes a first bottom wall 13a, and at least one first side wall 14a connected with the first bottom wall 13a, and two first connecting members 12a connected with the first bottom wall 13a. The first bottom wall 13a and the first side wall 14a cooperatively define the storage space 11a, the first bottom wall 13a, the first connecting members 12a, and the fixing assembly 20a cooperatively define the mounting space 21a.

In at least one embodiment, the receiving device 100a further includes a first magnetic member 17a for magnetically adsorbing a magnetic element, the first bottom wall 13a defines a receiving groove 18a, the first magnetic member 17a is received in the receiving groove 18a. The magnetic element can be an ETC (Electronic Toll Collection) sensor which can magnetically absorb with the first magnetic member 17a, and an ETC card for increasing a vehicle passing rate is inserted in the ETC sensor.

In at least one embodiment, the fixing assembly 20a includes two second connecting members 22a, the first connecting members 12a are detachably connected with the second connecting members 22a to detachably connect the receiving assembly 10a with the fixing assembly 20a.

In at least one embodiment, each of the first connecting members 12a defines a first receiving groove 121a, each of the second connecting members 22a defines a second receiving groove 221a, the receiving device 100a further includes two second magnetic members 122a and two third magnetic members 222a, the two second magnetic members 122a are respectively received in the first receiving grooves 121a, and the two third magnetic members 222a are respectively received in the second receiving grooves 221a, so the first connecting members 12a are detachably connected with the second connecting members 22a by forces between the second magnetic members 122a and the third magnetic members 222a. The magnetic force between the second magnetic member 122 and the third magnetic member 222 has a range of 300~600 milli Tesla, preferably 300~500 mT, much more preferably 350~400 mT.

In at least one embodiment, the first connecting member 12a defines a first positioning hole 125a, the second connecting member 22a defines a second positioning hole 225a, when the first connecting member 12a is connected with the second connecting member 22a, the first positioning hole 125a is communicated with the second positioning hole 225a.

In at least one embodiment, the first positioning hole 125a is semi circular shaped, the second positioning hole 225a is semi circular shaped, the first positioning hole 125a and the second positioning hole 225a cooperatively from a circular hole when the first connecting member 12a is connected with the second connecting member 22a.

In at least one embodiment, the mounting portion 201 further includes a front panel 2011 connected with the connecting beam 2013. The receiving device 100a further includes at least one side wing 15a connected with the first bottom wall 13a, the side wing 15a includes a curved surface 151a, the curved surface 151a is matched with the front panel 2011 in shape, when the connecting beam 2013 is received in the mounting space 21a, the curved surface 151a is abutted against the front panel 2011, so the receiving assembly 10a can be mounted on the front panel 2011 stably. The first bottom wall 13a can also be connected with the front panel 2011 by a connecting element, such as a double sides adhesive tape.

It should be understood that, the curved surface 151a can increase a contact area between the side wing 15a and the front panel 2011, so the receiving assembly 10a can be mounted on the front panel 2011 stably.

It should be understood that, as the receiving assembly 10a is mounted on the front panel, the movements of the objects in the storage space 11a would not affect the driver. Further, the connecting beam 2013 is close to driver, driver can easily install the receiving device 100a on the connecting beam 2013, or easily separate the receiving device 100a from the connecting beam 2013. The receiving device 100a can also be mounted elsewhere in the vehicle 200.

In at least one embodiment, the mounting portion 201 further includes a display panel 2012 connected with the connecting beam 2013, the display panel 2012 is opposite to the front panel 2011, the receiving assembly 10a can be clamped between the display panel 2012 and the front panel 2011 when the connecting beam 2013 is received in the mounting space 21a. In detail, the front panel 2011 is protruded with a blocking member 2014, the receiving assembly 10a can be clamped between the display panel 2012 and the blocking member 2014.

In at least one embodiment, a quantity of the at least one side wing 15a is two, the two side wings 15a are arranged on two opposite sides of the first bottom wall 13a.

In at least one embodiment, the receiving device 100a further includes at least one reinforcing member 16a, the reinforcing member 16a is connected between the side wing 15a and the first connecting member 12a.

In at least one embodiment, a quantity of the at least one reinforcing member 16a is two, each reinforcing member 16a is arranged between one corresponding side wing 15a and one corresponding first connecting member 12a.

In at least one embodiment, the fixing assembly 20a further includes a third connecting member 23a connected with the second connecting members 22a, the first bottom wall 13a, the first connecting members 12a, and the second connecting member 22a, and the third connecting member 23a cooperatively define the mounting space 21a.

In at least one embodiment, the third connecting member 23a is protruded with a retaining member 24a, the retaining member 24a is retained against the connecting beam 2013 when the receiving device 100a is mounted on the mounting portion 201, and the receiving device 100a can be mounted on the front panel 2011 stably.

In the technical solution of the present disclosure, the receiving device 100a includes the receiving assembly 10a having the storage space 11a for storing objects and the fixing assembly 20a. The fixing assembly 20a is detachably connected with the receiving assembly 10a, the fixing assembly 20a and the receiving assembly 10a cooperatively define the mounting space 21a, the connecting beam 2013 is received in the mounting space 21a, so as to mount the receiving device 100a on the mounting portion 201. The receiving device 100a of the present disclosure can be mounted on the mounting portion 201 of the vehicle 200, to improve a storage space of the vehicle 200.

Figure 4:
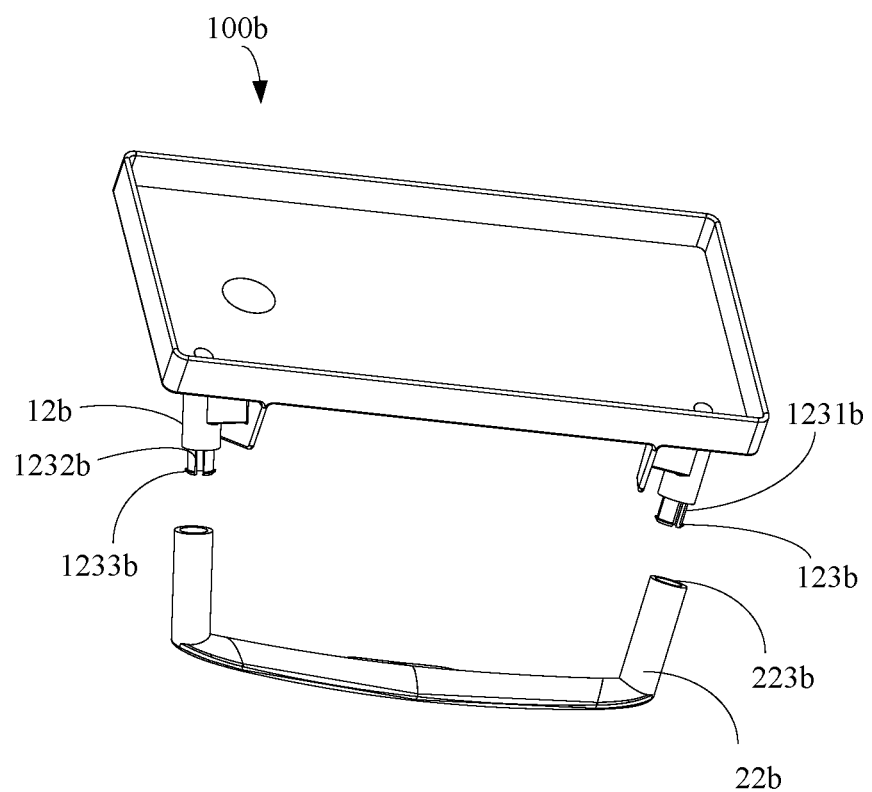
FIG. 4 is a structure diagram of a receiving device according to a second embodiment of the present disclosure.

Please referring to FIG. 4, the present disclosure provides a receiving device 100b according to a second embodiment. The receiving device 100b is similar to the receiving device 100a in structure, the differences between the receiving device 100b and the receiving device 100a include: one of the first connecting member 12b and the second connecting member 22b is protruded with a clamping member 123b, another one of the first connecting member 12b and the second connecting member 22b defines a clamping groove 223b, the clamping member 123b is detachably clamped in the clamping groove 223b.

In at least one embodiment, the clamping member 123b includes a plurality of clamping portions 1231b spaced apart from each other, each two adjacent clamping portions 1231b defines a gap 1232b, and a free end of the clamping portion 1231b is protruded with a protrusion 1233b. When the clamping member 123b is clamped in the clamping groove 223b, the protrusion 1233b is abutted against an inner wall of the clamping groove 223b.

Figure 5:
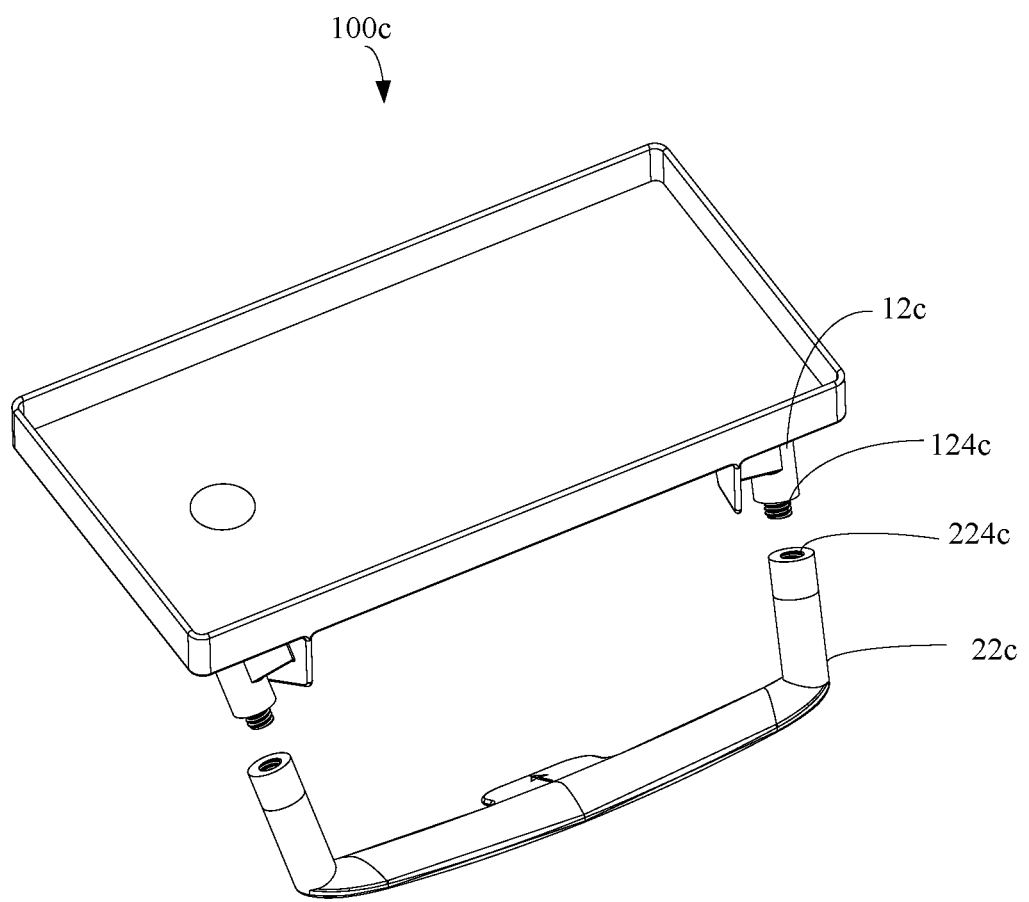
FIG. 5 is a structure diagram of a receiving device according to a third embodiment of the present disclosure.

Please referring to FIG. 5, the present disclosure provides a receiving device 100c according to a third embodiment. The receiving device 100c is similar to the receiving device 100a in structure, the differences between the receiving device 100c and the receiving device 100a include: one of the first connecting member 12c and the second connecting member 22c is protruded with a screw rod 124c, another one of the first connecting member 12c and the second connecting member 22c defines a screw hole 224c, the screw rod 124c is detachably received in the screw hole 224c.

Figure 6:
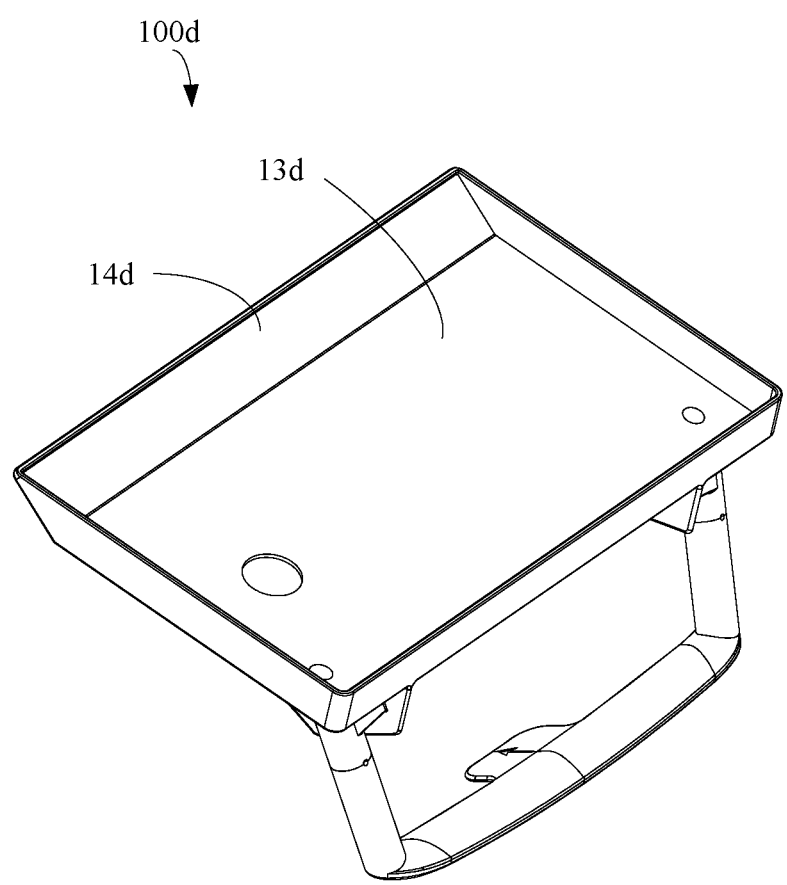
FIG. 6 is a structure diagram of a receiving device according to a fourth embodiment of the present disclosure.

Please referring to FIG. 6, the present disclosure provides a receiving device 100d according to a fourth embodiment. The receiving device 100d is similar to the receiving device 100a in structure, the differences between the receiving device 100d and the receiving device 100a include: a quantity of the at least one first side wall 14d is more than one, and an angle between the first side wall 14d and the first bottom wall 13d is greater than 90°, to increase a volume of the storage space.

In at least one embodiment, one first side wall 14d is inclined away from the front panel 2011.

Figure 7:
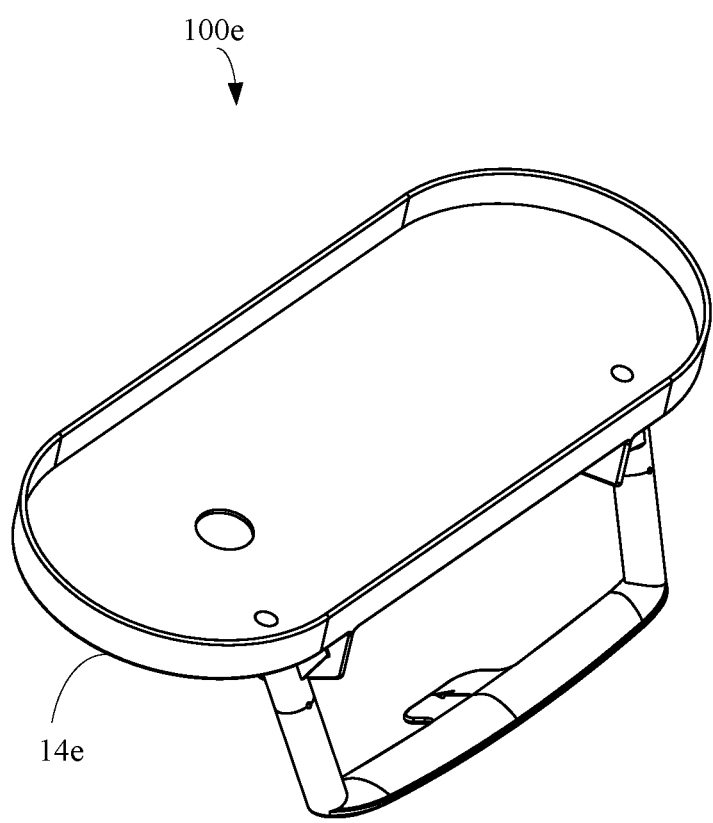
FIG. 7 is a structure diagram of a receiving device according to a fifth embodiment of the present disclosure.

Please referring to FIG. 7, the present disclosure provides a receiving device 100e according to a fifth embodiment. The receiving device 100e is similar to the receiving device 100a in structure, the differences between the receiving device 100e and the receiving device 100a include: a quantity of the at least one first side wall 14e is more than one, and at least one first side wall 14e is arc-shaped, to ensure safety.

In at least one embodiment, two opposite first side walls 14e are arc-shaped, and the side walls 14e are racetrack-shaped.

Figure 8:
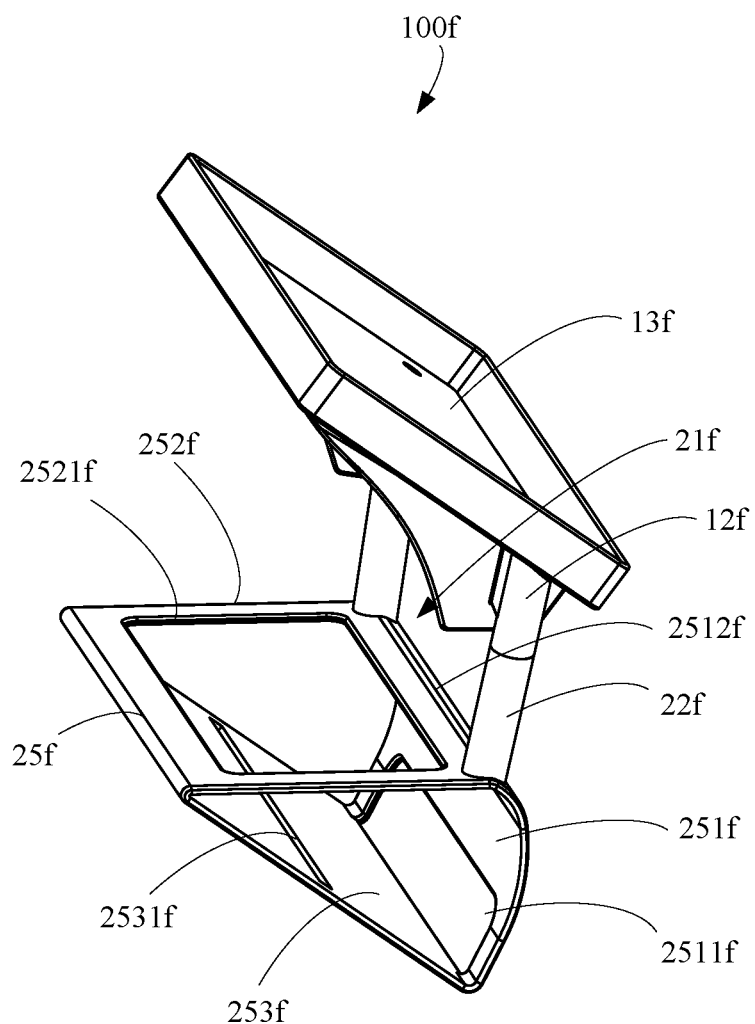
FIG. 8 is a structure diagram of a receiving device according to a sixth embodiment of the present disclosure.

Please referring to FIG. 8, the present disclosure provides a receiving device 100f according to a sixth embodiment. The receiving device 100f is similar to the receiving device 100a in structure, the differences between the receiving device 100f and the receiving device 100a include: the fixing member 20f further includes a first storage box 25f connected with the second connecting members 22f, the first storage box 25f, the second connecting members 22f, the first connecting members 12f, and the first bottom wall 13f cooperatively define the mounting space 21f, the first storage box 25f defines at least one opening for placing objects in the first storage box 25f or taking objects out of the first storage box 25f.

In at least one embodiment, the first storage box 25f includes a second side wall 251f and a third side wall 252f connected with the second side wall 251f. The second connecting members 22f is connected at an angle with the second side wall 251f, the third side wall 252f, or a connecting portion 2512f of the second side wall 251f and the third side wall 252f.

In at least one embodiment, the second side wall 251f defines a first opening 2511f, user can place objects, such as mobile phones, earphones, into the first storage box 25f by the first opening 2511f.

In at least one embodiment, the second side wall 251f is arc-shaped.

In at least one embodiment, the third side wall 252f defines a second opening 2521f, user can place objects, such as mobile phones, earphones, into the first storage box 25f by the second opening 2521f.

In at least one embodiment, when the receiving device 100f is mounted on the mounting portion 201, the second opening 2521f is covered by the front panel 2011, so the second opening 2521f can be arranged to be larger than the first opening 2511f.

In at least one embodiment, the first storage box 25f further includes a second bottom wall 253f connected with the second side wall 251f and the third side wall 252, the second bottom wall 253f defines a third opening 2531f, the first opening 2531f is narrow and long, the first opening 2531f is configured to facilitate taking paper towels.

Figure 9:
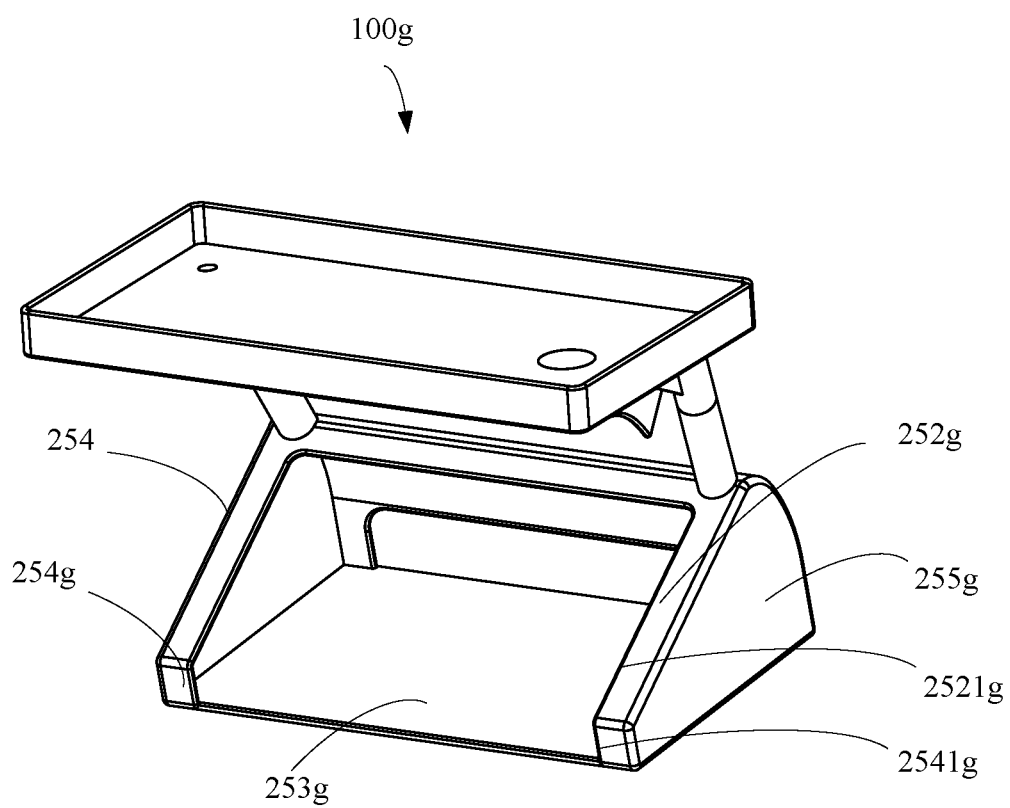
FIG. 9 is a structure diagram of a receiving device according to a seventh embodiment of the present disclosure.

Please referring to FIG. 9, the present disclosure provides a receiving device 100g according to a seventh embodiment. The receiving device 100g is similar to the receiving device 100f in structure, the differences between the receiving device 100g and the receiving device 100f include: the first storage box 25g further includes at least one fourth side wall 254g connected between the third side wall 252g and the second bottom wall 253g, the fourth side wall 254g defines a fourth opening 2541g communicated with the second opening 2521g; the first storage box 25g further includes at least one fifth side wall 255g, the fifth side wall 255g is connected between the third side wall 252g, the second bottom wall 253g, and the fourth side wall 254g.

In at least one embodiment, the first storage box 25g further includes two fifth side walls 255g arranged on two opposite ends of the first storage box 25g.

Figure 10:
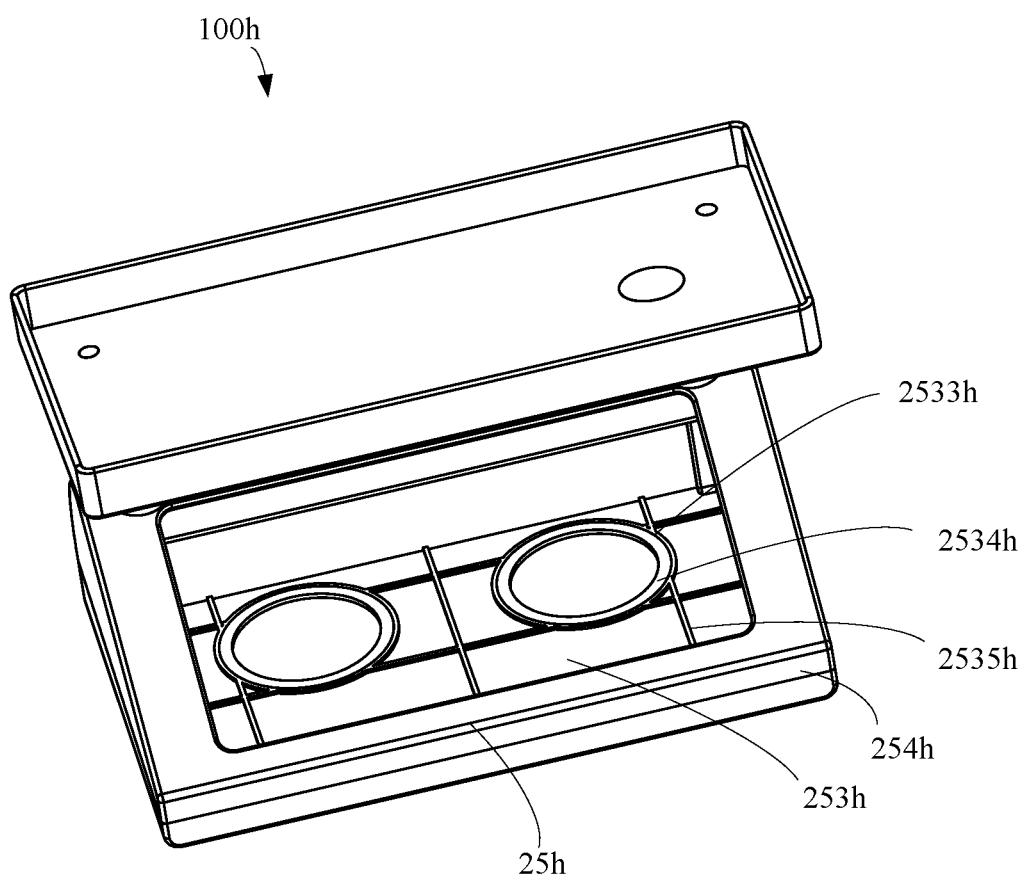
FIG. 10 is a structure diagram of a receiving device according to an eighth embodiment of the present disclosure.

Please referring to FIG. 10, the present disclosure provides a receiving device 100h according to an eighth embodiment. The receiving device 100h is similar to the receiving device 100g in structure, the differences between the receiving device 100h and the receiving device 100g include: the second bottom wall 253h defines at lease one receiving groove 2533h, the first storage box 25h further includes at least one fourth magnetic member 2534h received in the receiving groove 2533h, the fourth magnetic member 2534h is configured for magnetically adsorbing an electronic device, such as a mobile phone.

In at least one embodiment, the fourth side wall 254h does not define the fourth opening.

In at least one embodiment, the second bottom wall 253h is protruded with at least one reinforcing rib 2535h.

Figure 11:
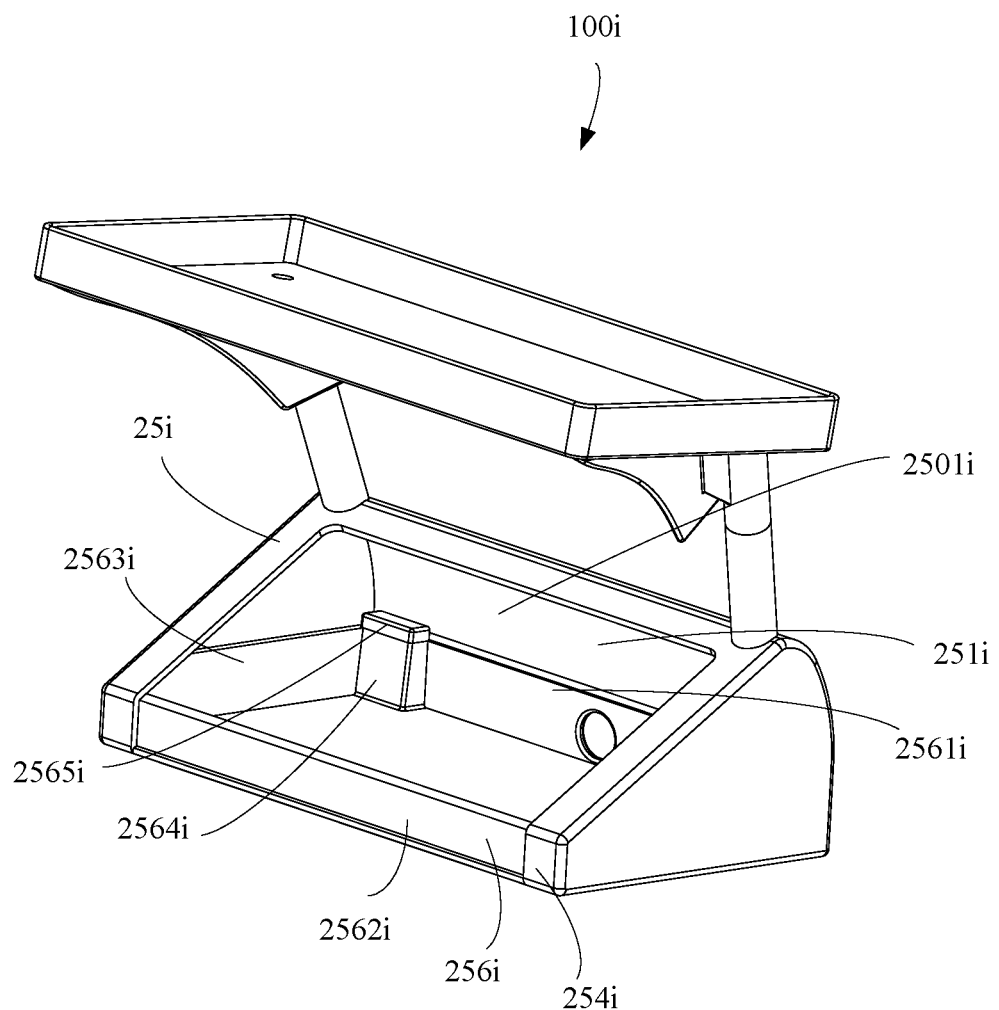
FIG. 11 is a structure diagram of a receiving device according to a ninth embodiment of the present disclosure.
Figure 12:
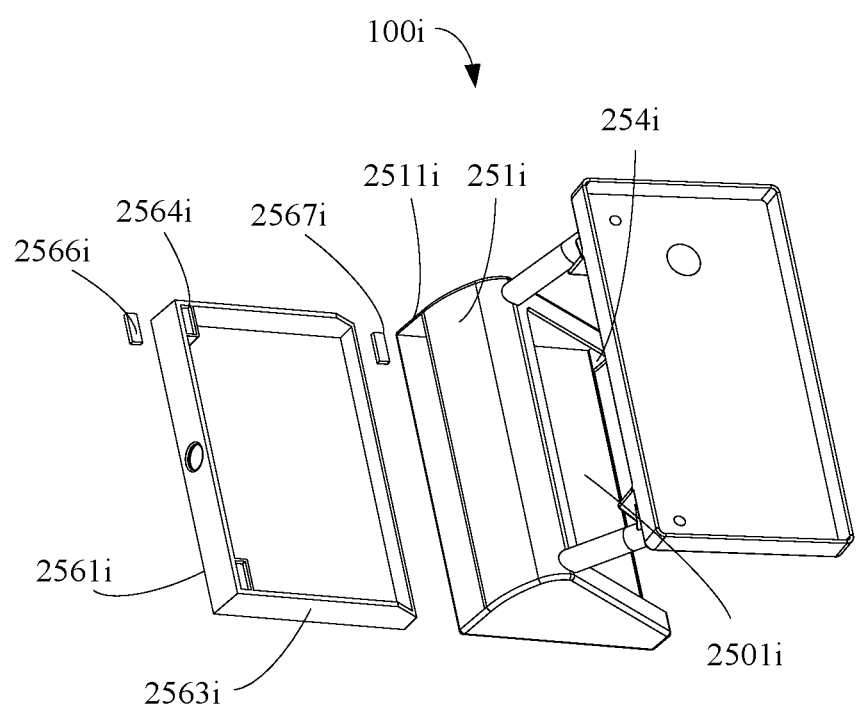
FIG. 12 is an exploded view of the receiving device of FIG. 11.

Please referring to FIGS. 11 and 12, the present disclosure provides a receiving device 100i according to a ninth embodiment. The receiving device 100i is similar to the receiving device 100g in structure, the differences between the receiving device 100i and the receiving device 100g include: the first storage box 25i further includes a drawer 256i and a receiving cavity 2501i, the drawer 256i is received in the receiving cavity 2501i in a drawable manner by the first opening 2511i.

In at least one embodiment, the first opening 2511i extends through two opposite end walls of the second side wall 251i.

In at least one embodiment, the drawer 256i is stopped by the fourth side wall 254i.

In at least one embodiment, the drawer 256i includes a front wall 2561i, a back wall 2562i opposite to the front wall 2561i, two opposite sixth side walls 2563i respectively connected with the front wall 2561i and the back wall 2562i.

In at least one embodiment, the front wall 2561i defines a hole (not labeled) which can be used as a handle.

In at least one embodiment, the drawer 256i includes at least one first receiving portion 2564i arranged on the front wall 2561i and/or the sixth side wall 2563i, and at least one second receiving portion 2565i arranged on the second side wall 251i. The drawer 256i further includes at least one fourth magnetic member 2566i received in the first receiving portion 2564i, and at least one fifth magnetic member 2567i received in the second receiving portion 2565i. When the drawer 256i is received in the receiving cavity 2501i, the fourth magnetic member 2566i is absorbed with the fifth magnetic member 2567i, to prevent the drawer 256i from moving out of the receiving cavity 2501i automatically.

In at least one embodiment, the first receiving portion 2564i may define a groove (not labeled) for receiving fourth magnetic member 2566i.

In at least one embodiment, the second receiving portion 2565i may define a groove (not shown) for receiving fifth magnetic member 2567i.

Figure 13:
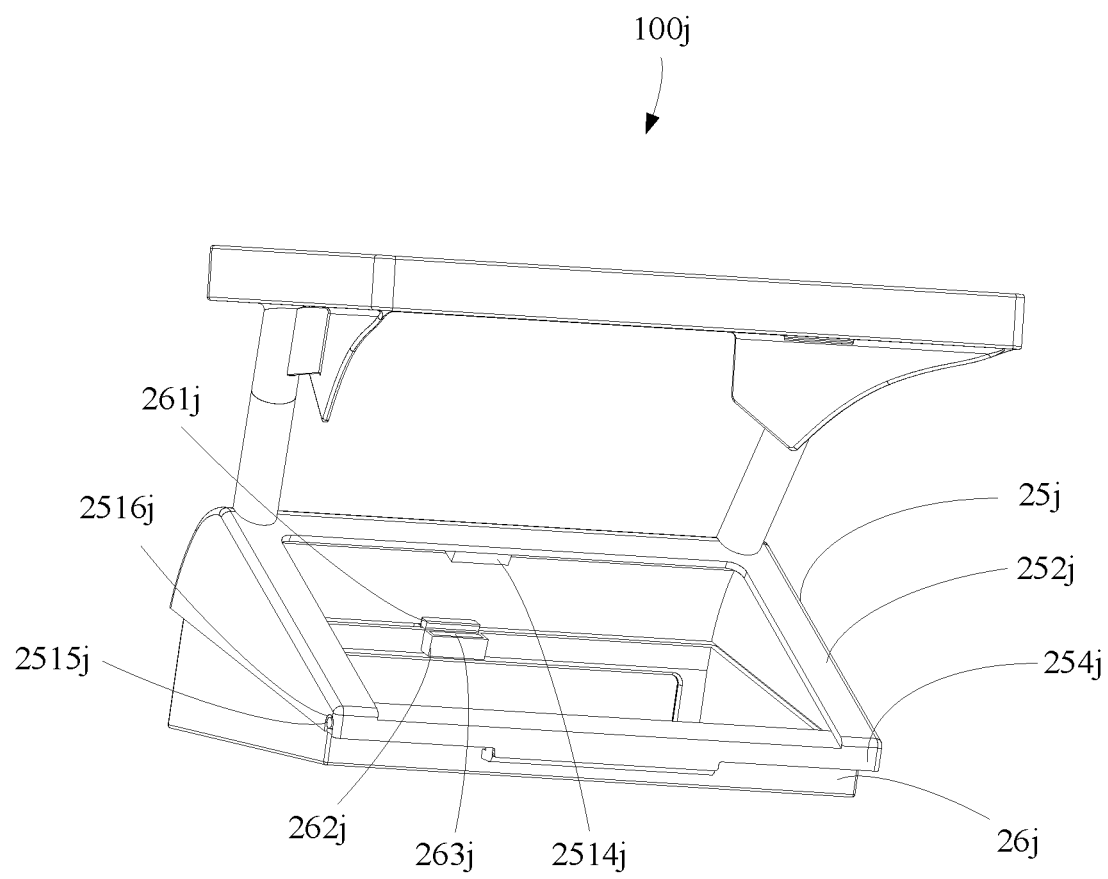
FIG. 13 is a structure diagram of a receiving device according to a tenth embodiment of the present disclosure.
Figure 14:
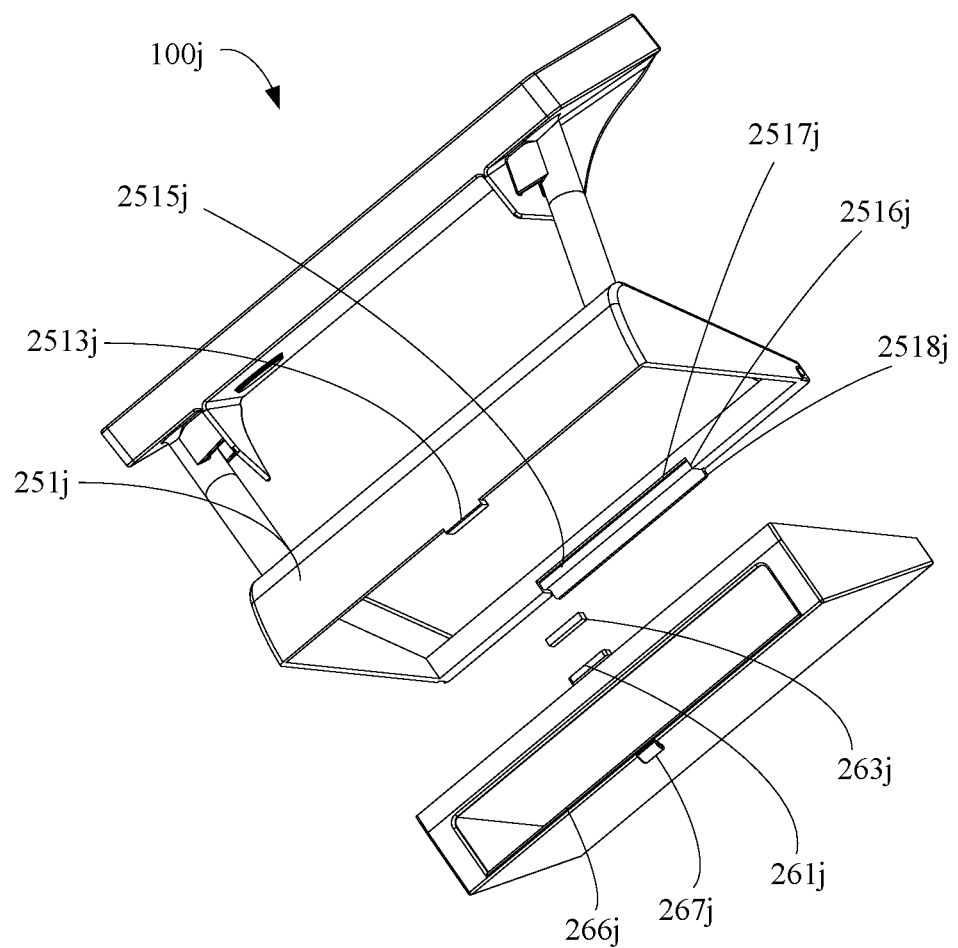
FIG. 14 is an exploded view of the receiving device of FIG. 13.
Figure 15:
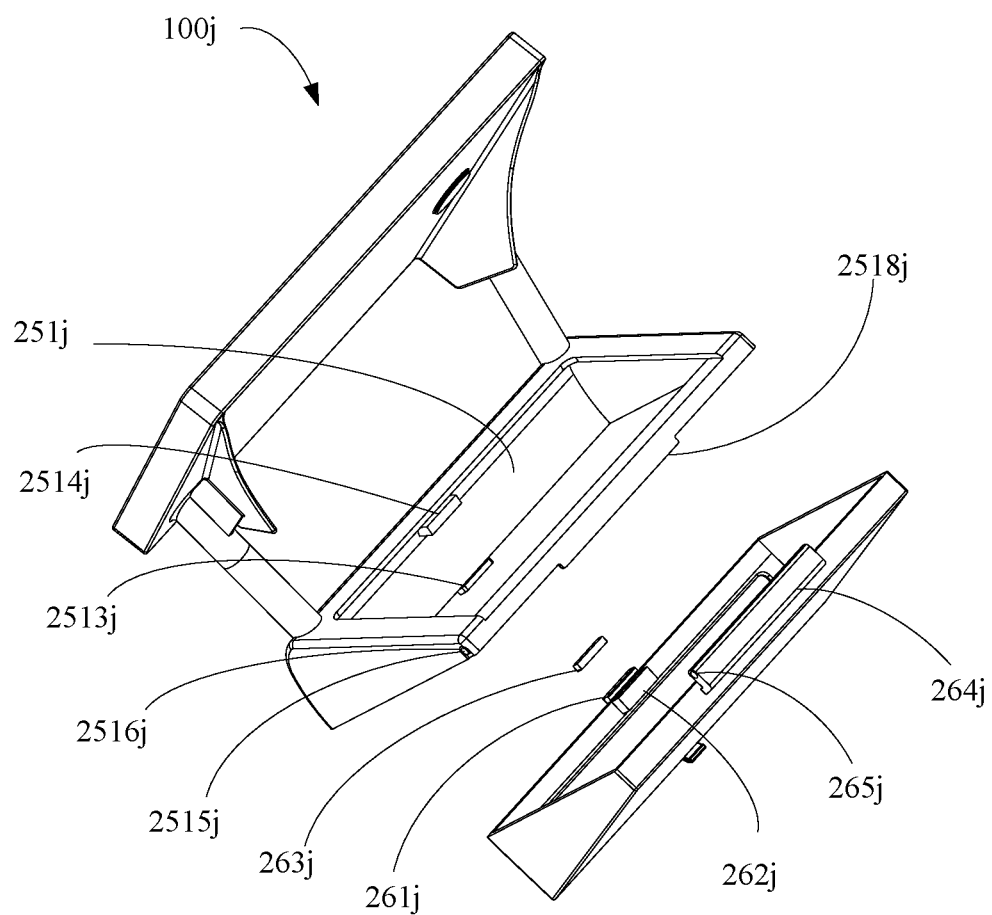
FIG. 15 is similar to FIG. 14, but shown from another view.

Please referring to FIGS. 13 to 15, the present disclosure provides a receiving device 100j according to a tenth embodiment. The receiving device 100j is similar to the receiving device 100h in structure, the differences between the receiving device 100j and the receiving device 100h include: the receiving device 100j further includes a second storage box 26j communicated with the first storage box 25j, one side of the second storage box 26j is rotatably connected with the first storage box 25j, and another side of the second storage box 26j is detachably connected with the first storage box 25j.

In at least one embodiment, the first storage box 25j does not include the second bottom wall 253j, so the first storage box 25j can be communicated with the second storage box 26j.

In at least one embodiment, the second side wall 251j does not define the first opening 2511j.

In at least one embodiment, the first storage box 25j includes a blocking member 2513j arranged on a lower end of the second side wall 251j, and a sixth magnetic member 2514j arranged on an upper end of the second side wall 251j. The second storage box 26j includes a protrusion 261j, a first accommodating portion 262j, and a seventh magnetic member 263j received in the first accommodating portion 262j. When the second storage box 26j is in a closed state, the sixth magnetic member 2514j is absorbed with the seventh magnetic member 263j, and the second storage box 26j is at least partially received in the first storage box 25j. When the second storage box 26j is in an opened state, the protrusion 261j is limited by the blocking member 2513j to prevent the second storage box 26j from completely separating from the first storage box 25j.

In at least one embodiment, the second side wall 251j is arc-shaped to provide a space for a movement of the protrusion 261j.

In at least one embodiment, the first storage box 25j further includes a third receiving portion 2516j opposite to the blocking member 2513j and arranged on the fourth side wall 254j and/or the third side wall 252j, a shaft 2515j received in the third receiving portion 2516j, the third receiving portion 2516j defines a notch 2517j. The second storage box 26j includes a second accommodating portion 264j defining a through hole 265j, the second accommodating portion 264j is received in the notch 2517j, the shaft 2515j is received in the through hole 265j of the second accommodating portion 264j, the second accommodating portion 264j is rotatably connected with the shaft 2515j, so the second storage box 26j is rotatably connected with the first storage box 25j.

In at least one embodiment, the first storage box 25j further includes a limiting portion 2518j protruded from the third receiving portion 2516j, the limiting portion 2518j is extended from a wall of the notch 2517j. The limiting portion 2518j is configured to limit a rotating degree of the second storage box 26j.

In at least one embodiment, the fourth side wall 254j can be acted as the third receiving portion 2516j.

In at least one embodiment, the second storage box 26j defines a opening 266j, user can put objects in the second storage box 26j by the opening 266j.

In at least one embodiment, the second storage box 26j further includes a handle 267j.

Figure 16:
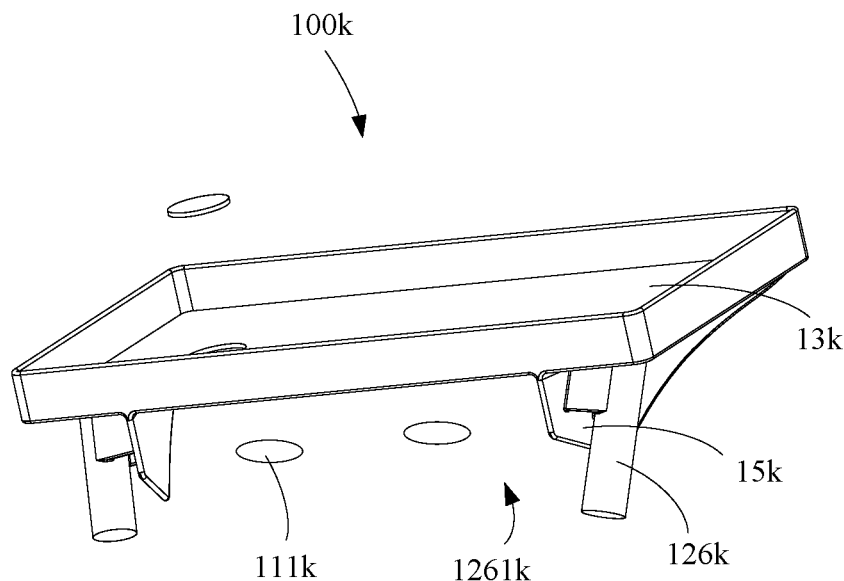
FIG. 16 is a structure diagram of a receiving device according to an eleventh embodiment of the present disclosure.

Please referring to FIG. 16, the present disclosure provides a receiving device 100k according to an eleventh embodiment. The receiving device 100k is similar to the receiving device 100a in structure, the differences between the receiving device 100k and the receiving device 100a include: the receiving device 100k does not include the fixing assembly, the receiving assembly 10k of the receiving device 100k can be mounted on the front panel 2011.

In at least one embodiment, the first bottom wall 13k of the receiving assembly 10k is connected with the front panel 2011 by at least connecting member 111k, the connecting member 111k can be a glue, a double sides adhesive tape, or the like.

In at least one embodiment, the receiving assembly 10k is mounted on the front panel 2011 and clamped between the front panel 2011 and the display panel 2012. In detail, the front panel 2011 is protruded with a blocking member 2014, the receiving assembly 10k can be clamped between the display panel 2012 and the blocking member 2014.

In at least one embodiment, the receiving assembly 10k further includes a clamping member 126k defining a clamping space 1261k. The receiving assembly 10k is mounted on the front panel 2011, and the connecting beam 2013 is clamped in the clamping space 1261k; or the receiving assembly 10k is mounted on the front panel 2011 and clamped between the front panel 2011 and the display panel 2012, and the connecting beam 2013 is clamped in the clamping space 1261k.

In detail, the receiving assembly 10k includes two opposite clamping columns (not labeled), the clamping columns and the first bottom wall 13k cooperatively define the clamping space 1261k.

Figure 17:
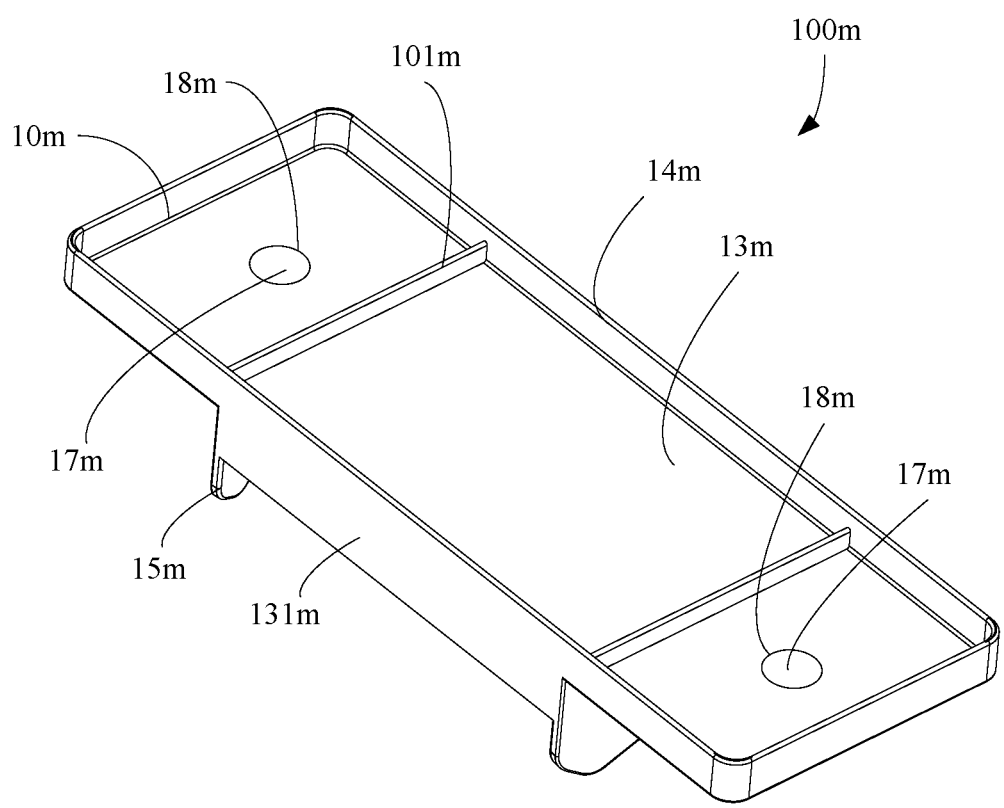
FIG. 17 is a structure diagram of a receiving device according to a twelfth embodiment of the present disclosure.
Figure 18:
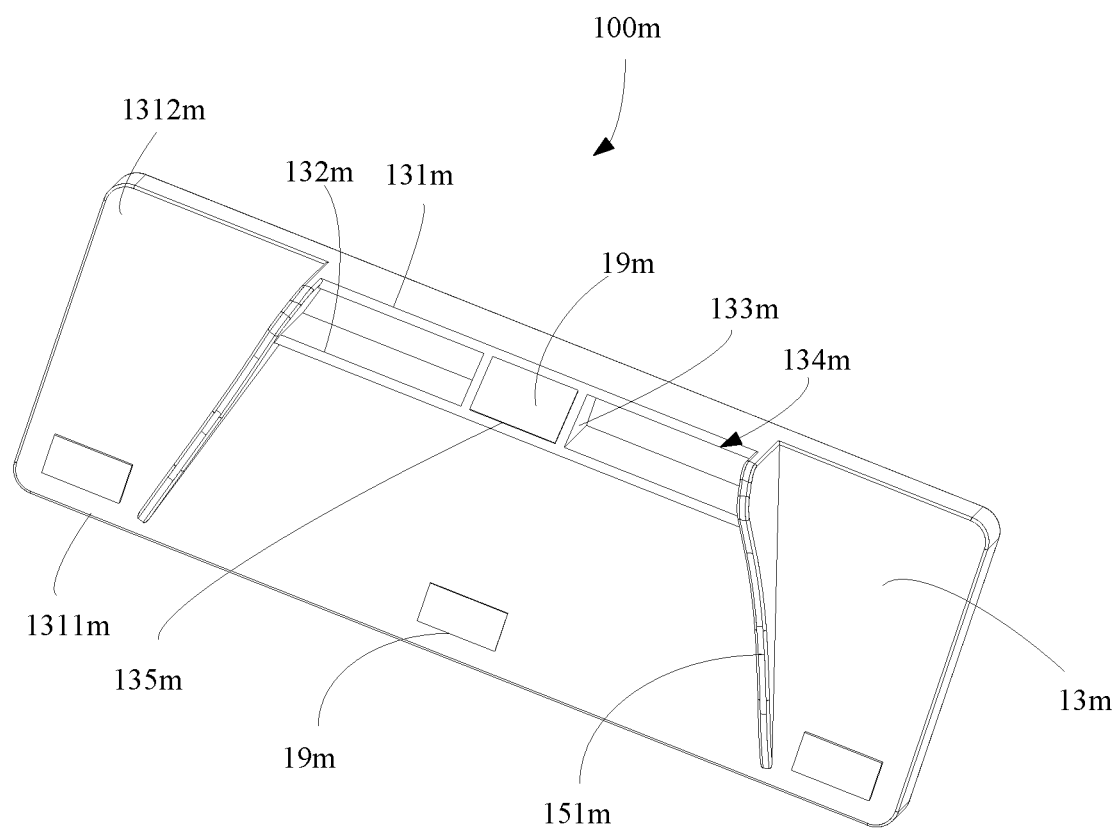
FIG. 18 is a structure diagram of the receiving device of FIG. 17 shown from another angle.
Figure 19:
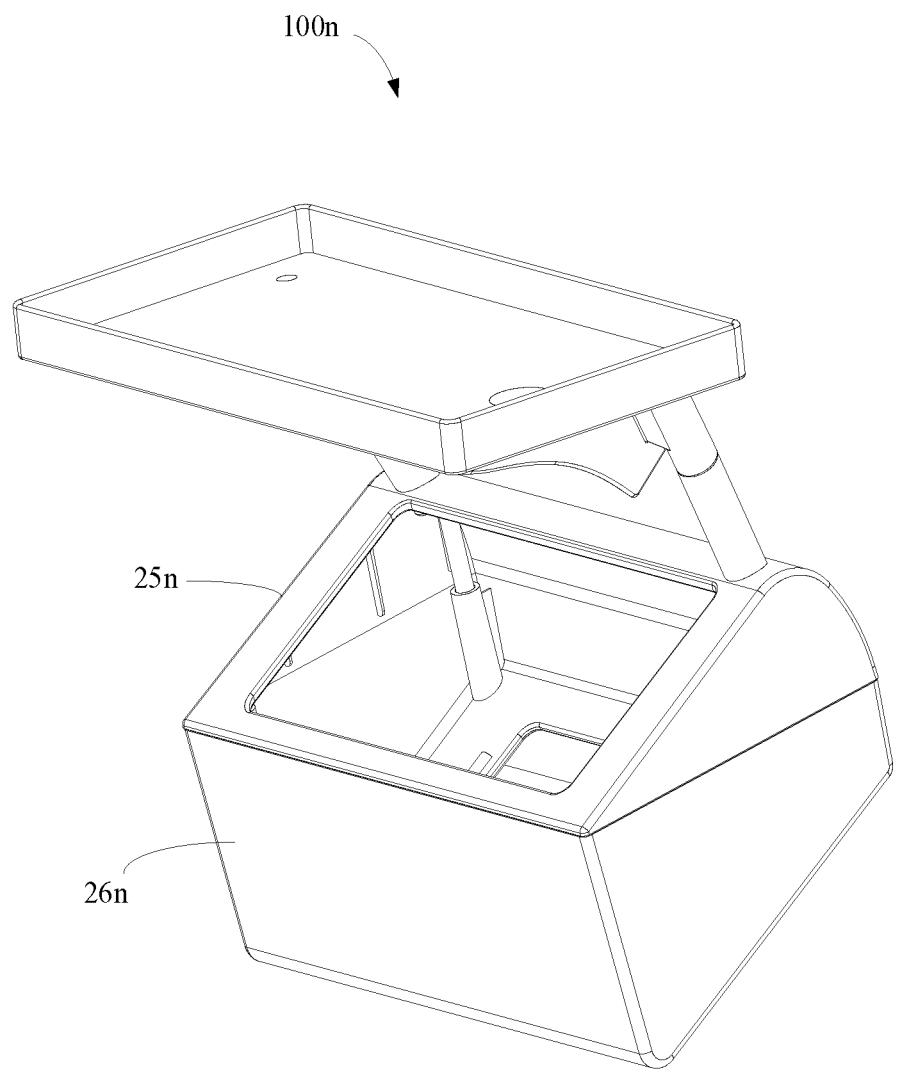
FIG. 19 is a structure diagram of a receiving device according to a thirteenth embodiment of the present disclosure.
Figure 20:
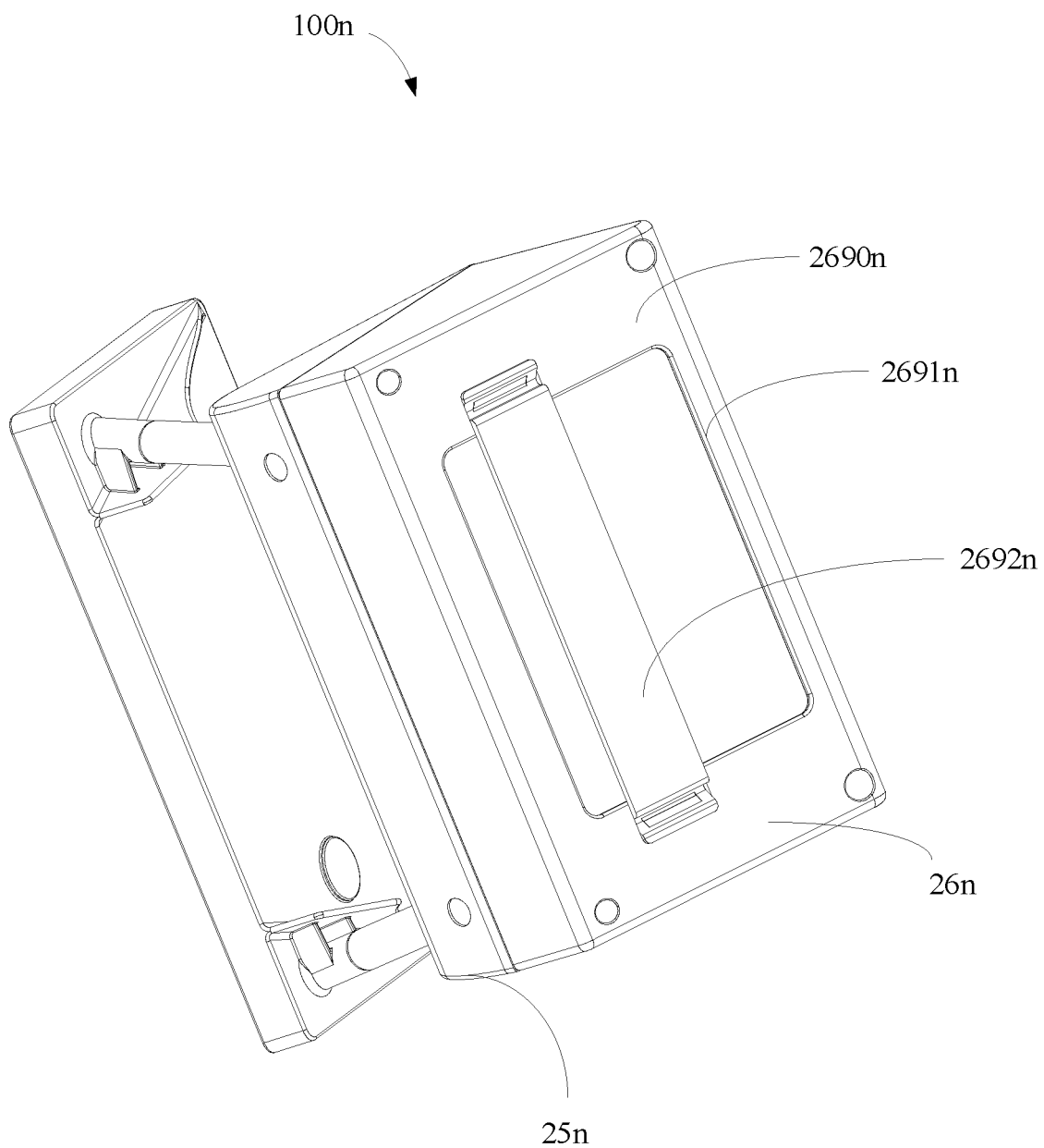
FIG. 20 is a structure diagram of the receiving device of FIG. 19 shown from another angle.
Figure 21:
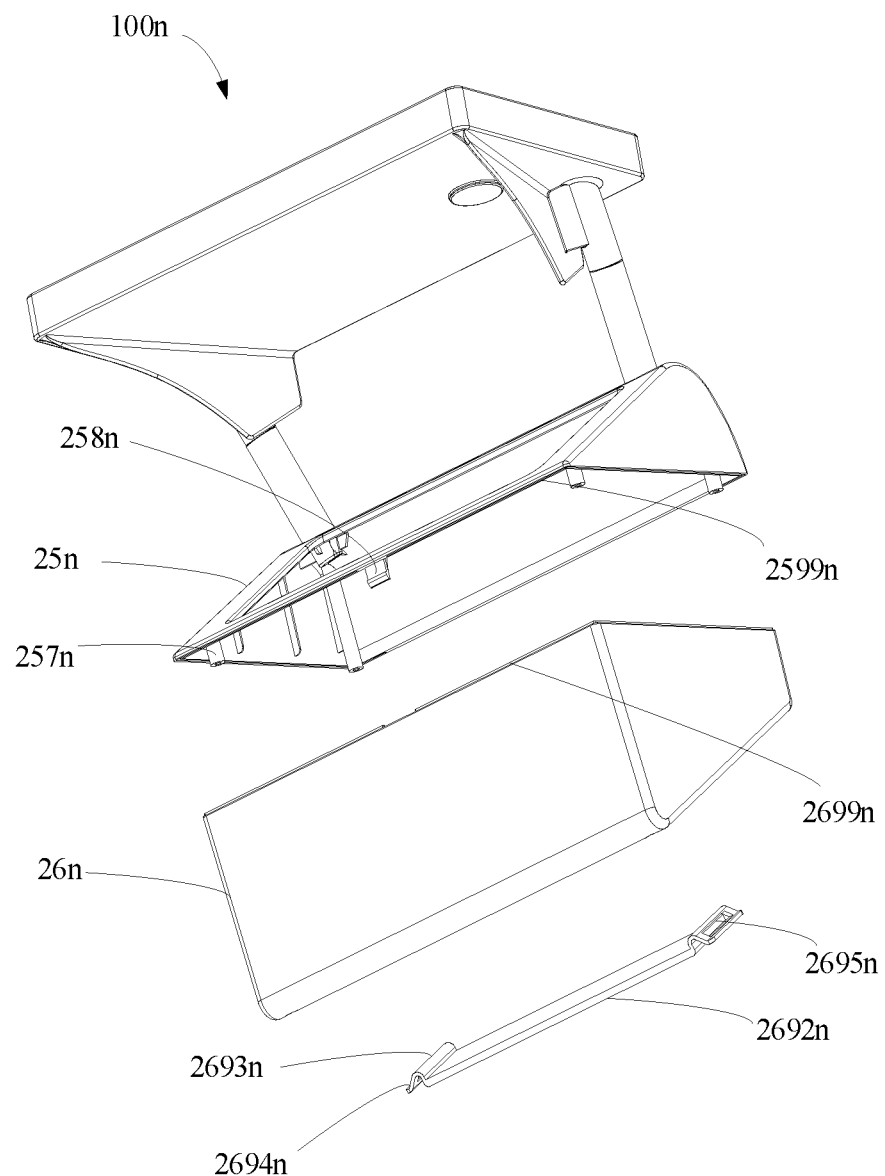
FIG. 21 is an exploded view of the receiving device of FIG. 19.
Figure 22:
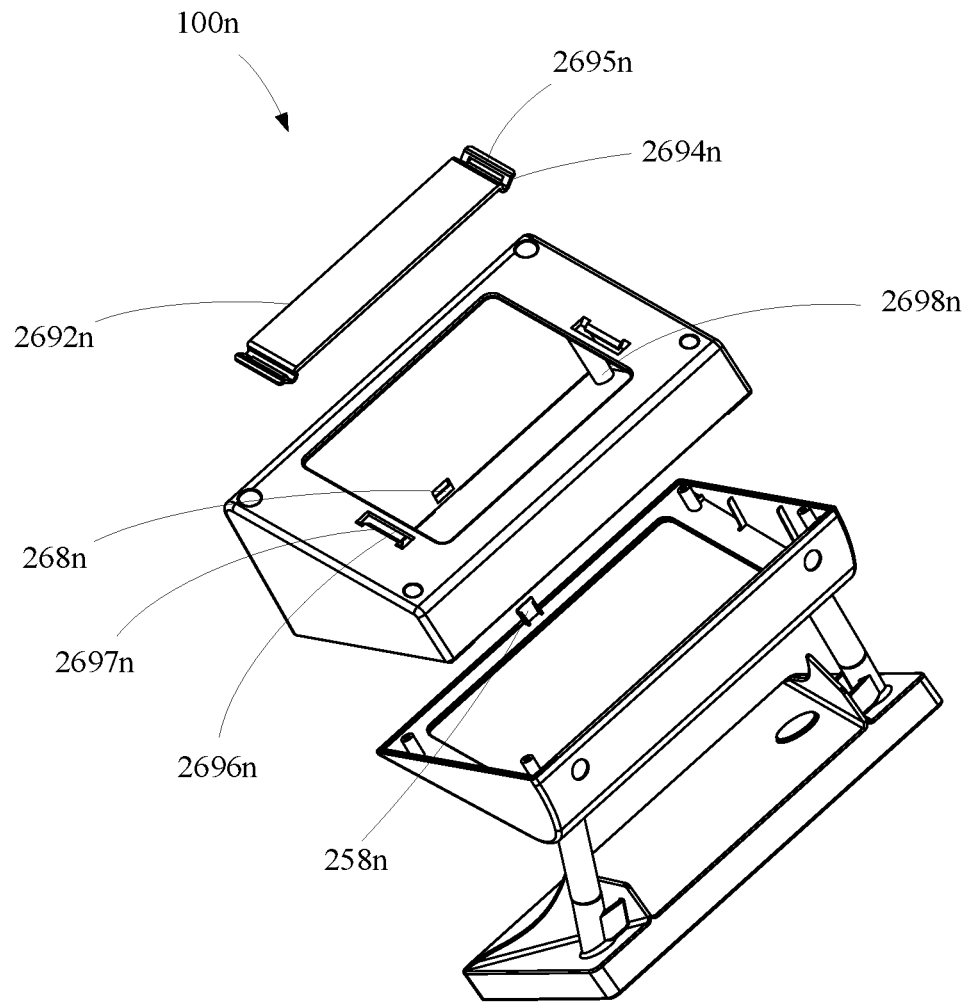
FIG. 22 is similar to FIG. 21, but shown from another view.

Please referring to FIGS. 17 and 18, the present disclosure provides a receiving device 100m according to a twelfth embodiment. The receiving device 100m is similar to the receiving device 100k in structure, the differences between the receiving device 100m and the receiving device 100k include: the receiving device 100m does not include the clamping member, the receiving assembly 10m of the receiving device 100m can be mounted on the front panel 2011.

In at least one embodiment, the receiving assembly 10m is connected with the front panel 2011 by at least connecting member 19m, the connecting member 19m can be a glue, a double sides adhesive tape, or the like.

In at least one embodiment, a first side 1311m of the receiving assembly 10m is arranged with three connecting members 19m spaced apart from each other, and the connecting members 19m can connect the receiving assembly 10a with the front panel 2011.

In at least one embodiment, the three connecting members 19m are arranged on the first side 1311m of the bottom wall 13m.

In at least one embodiment, the receiving assembly 10m further includes a first connecting edge 131m, a side of the first connecting edge 131m is connected with the side wall 14m. Two ends of the first connecting edge 131m are respectively connected with the side wings 15m. The receiving assembly 10m further includes a second connecting edge 132m opposite to the first connecting edge 131m, two end of the second connecting edge 132m are also respectively connected with side wings 15m. A height of the second connecting edge 132m is greater than that of the first connecting edge 131m, so a mounting space 134m composed of the first connecting edge 131m, the second connecting edge 132m, and the side wings 15m is matched with the connecting beam 2013 in shape, the connecting beam 2013 can be mounted in the mounting space 134m.

In at least one embodiment, two third connecting edges 133m are arranged between the first connecting edge 131m and the second connecting edge 132m, and the third connecting edge 133m, the second connecting edge 132m, and the first connecting edge 131m cooperatively form a receiving groove 135m, one connecting member 19m is received in the receiving groove 135m, the connecting member 19m can attach with the connecting beam 2013, so the receiving assembly 10m can stably mounted on the connecting beam 2013.

In at least one embodiment, the first connecting edge 131m, the second connecting edge 132m, and the third connecting edges 133m are all arranged on a second side 1312m of the first bottom wall 13m.

In at least one embodiment, as the height of the second connecting edge 132m is greater than that of the first connecting edge 131m, free ends of the first connecting edge 131m and the second connecting edge 132m can match with the connecting beam 2013 in shape.

In at least one embodiment, the height of the third connecting edge 133m gradually increases along a direction from the second side 1312m to the first side 1311m. So that, free ends of the third connecting edges 133m can match with the connecting beam 2013 in shape.

In at least one embodiment, a depth of the receiving groove 135m also gradually increases along the direction from the second side 1312m to the first side 1311m, so the connecting member 19m is inclined, and the inclined connecting member 19m can match with the connecting beam 2013 in shape.

In at least one embodiment, the receiving assembly 10m is mounted on the front panel 2011 and clamped between the front panel 2011 and the display panel 2012. In detail, the receiving assembly 10k can be clamped between the display panel 2012 and the blocking member 2014 of the front panel 2011.

In at least one embodiment, the receiving assembly 10m is mounted on the front panel 2011 and clamped between the front panel 2011 and the display panel 2012, the connecting beam 2013 is mounted in the mounting space 134m.

In at least one embodiment, the first bottom wall 13m of the receiving assembly 10m defines two third receiving grooves 18m, the two third receiving grooves 18m are defined in two opposite sides of the first bottom wall 13m. And two first magnetic member 17m are respectively received in the third receiving grooves 18m. The first magnetic member 17m can magnetically absorb with the ETC sensor, and the ETC card for increasing the vehicle passing rate is inserted in the ETC sensor.

Please referring to FIGS. 19 to 22, the present disclosure provides a receiving device 100n according to a thirteenth embodiment. The receiving device 100n is similar to the receiving device 100h in structure, the differences between the receiving device 100n and the receiving device 100h include: the receiving device 100n further includes a second storage box 26n connected with the first storage box 25n; the second storage box 26n includes a third bottom wall 2690n, the third bottom wall 2690n defines a fifth opening 2691n, the second storage box 26n further includes a supporting element 2692n, the supporting element 2692n is arranged on the third bottom wall 2690n and divides the fifth opening 2691n into two sub-openings (not labeled), a wet tissue box can be placed in the second storage box 26n and supported by the supporting element 2692n, and wet tissues can be taken out from the sub-openings.

In at least one embodiment, the first storage box 25n is substantially triangular shaped, the second storage box 26n is also substantially triangular shaped.

In at least one embodiment, the wet tissue box usually has a big lid, a size of at lease one of the two sub-openings is no less than a size of the lid, so that the lid can be opened or closed when the box for the wet tissue box is placed in the second storage box 26n.

In at least one embodiment, the first storage box 25n includes at least one connecting element 257n, the second storage box 26n includes at least one connecting element 2698n, the connecting element 257n is detachably connected with the connecting element 2698n, so that the first storage box 25n can be detachably connected with the second storage box 26n.

In at least one embodiment, the first storage box 25n includes a clamping element 258n, the second storage box 26n includes a notch 268n, the clamping element 258n is detachably clamped in the notch 268n, so that the first storage box 25n can be detachably connected with the second storage box 26n.

In at least one embodiment, at least one edge of the first storage box 25n includes a receiving groove 2599n, at least one edge of the second storage box 26n includes a protrusion 2699n, the protrusion 2699n is detachably received in the receiving groove 2599n, so that the first storage box 25n can be detachably connected with the second storage box 26n.

In at least one embodiment, the first storage box 25n does not include the second bottom wall, so the first storage box 25n can be communicated with the second storage box 26n.

In at least one embodiment, each end of the supporting element 2692n includes a connecting portion 2693n, the third bottom wall 2690n of the second storage box 26n defines two opposite receiving grooves 2696n, the connecting portion 2693n is detachably received in the receiving groove 2696n.

In at least one embodiment, the connecting portion 2693n is U-shaped, arc-shaped, or wave shaped.

In at least one embodiment, the connecting portion 2693n includes two opposite sides 2694n, an outer side 2694n defines a receiving groove 2695n. The third bottom wall 2690n defines two receiving groove 2696n, a protrusion 2697n is protruded from an inner wall of the receiving groove 2696n. When the connecting portion 2693n is received in the receiving groove 2696n, the protrusion 2697n is clamped in the receiving groove 2695n. In detail, the sides 2694n are received in the receiving groove 2696n.

In at least one embodiment, the receiving grooves 2696n are defined at two sides of the fifth opening 2691n.

In at least one embodiment, the side 2694n is arc-shaped, or straight-shaped.

In at least one embodiment, an inner wall of the receiving groove 2696n away from the fifth opening 2691n is protruded with the protrusion 2697n.

Figure 23:
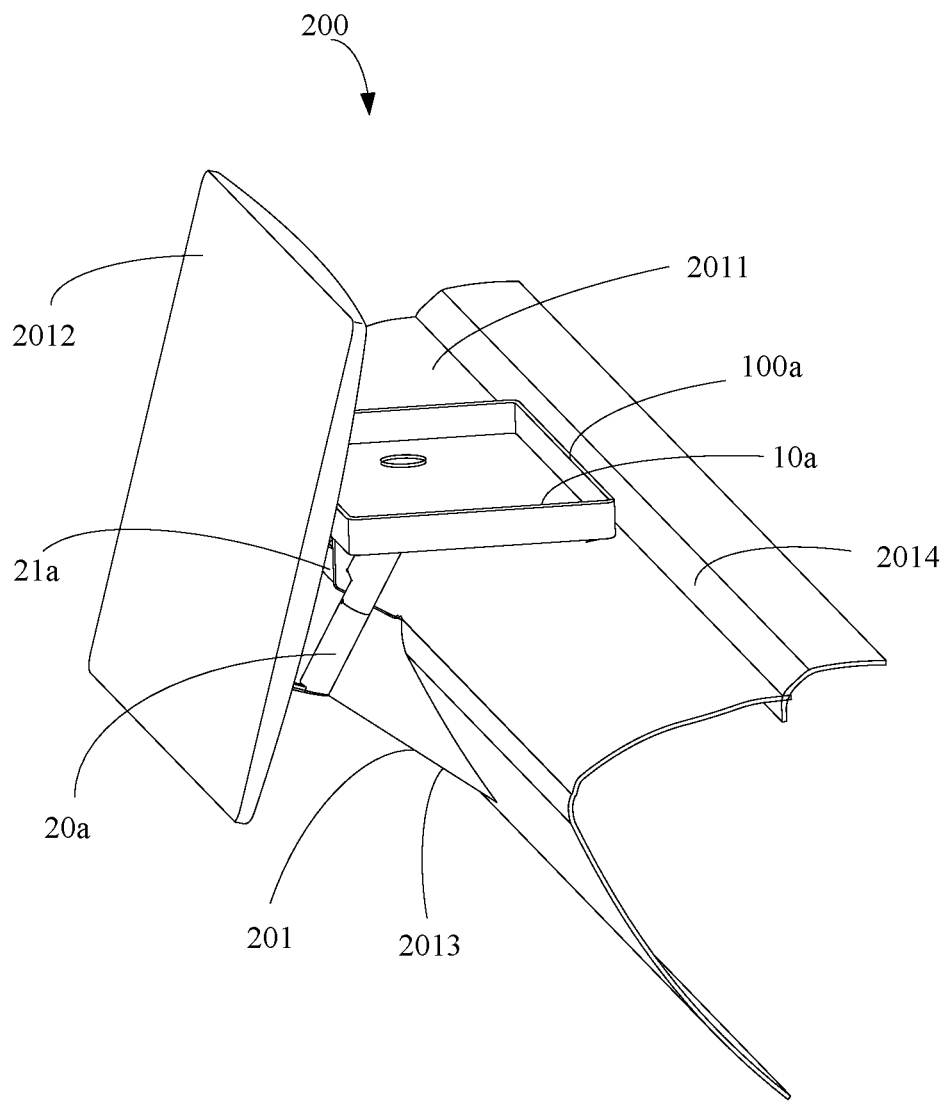
FIG. 23 is a structure diagram of a part of a vehicle according to an embodiment of the present disclosure, wherein, the receiving device is mounted on a mounting portion.

Referring to FIG. 23, the present disclosure further provides a vehicle 200, such as a Tesla. The vehicle 200 includes a mounting portion 201 and the receiving device. In the embodiment, the receiving device 100a is used as an example to illustrate how the receiving device 100a is mounted on the mounting portion 201.

As the vehicle 200 adopts the technical proposals of the above exemplary embodiments, the vehicle 200 at least has the beneficial effects of the technical proposals of the above exemplary embodiments, no need to repeat again.

Figure 24:
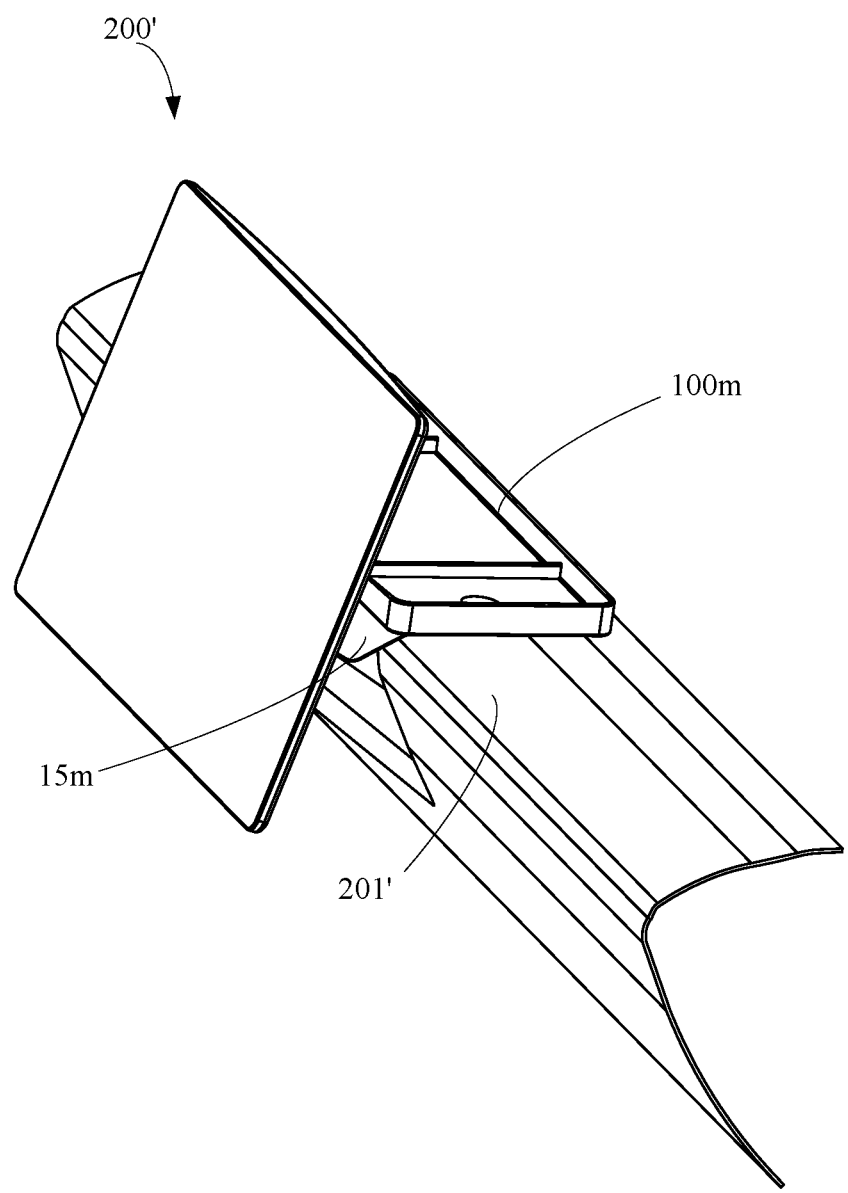
FIG. 24 is a structure diagram of a part of a vehicle according to another embodiment of the present disclosure, wherein, the receiving device is mounted on a mounting portion.

Referring to FIG. 24, the present disclosure further provides a vehicle 200', such as a Tesla. The vehicle 200' includes a mounting portion 201' and the receiving device. In the embodiment, the receiving device 100m is used as an example to illustrate how the receiving device 100m is mounted on the mounting portion 201'.

As the vehicle 200' adopts the technical proposals of the above exemplary embodiments, the vehicle 200' at least has the beneficial effects of the technical proposals of the above exemplary embodiments, no need to repeat again.

The above description is merely some embodiments. It should be noted that for one with ordinary skills in the art, improvements can be made without departing from the concept of the present disclosure, but these improvements shall fall into the protection scope of the present disclosure.

What is claimed is:

1. A receiving device, configured to be mounted in a vehicle, the vehicle comprises a mounting portion, the mounting portion comprises a display panel and a connecting beam configured to support the display panel, wherein the receiving device comprises:
   a receiving assembly, defining a storage space for storing objects; and
   a fixing assembly, magnetically connected with the receiving assembly to define a mounting opening, in a mounting state, the connecting beam passes through the mounting opening, so that the receiving device is connected with the mounting portion;
   wherein the receiving assembly comprises two first connecting members; and
   the fixing assembly comprises two second connecting members; each of the first connecting members defines a receiving recess, each of the second connecting members defines a receiving recess, the receiving device further comprises two second magnetic members respectively received in the receiving recesses of the first connecting members, and two third magnetic members respectively received in the receiving recesses of the second connecting members, the first connecting member is detachably connected with the second connecting member by a magnetic force between the second magnetic member and the third magnetic member to detachably connect the receiving assembly with the fixing assembly; the magnetic force between the second magnetic member and the third magnetic member has a range of 300~600 mT.

2. The receiving device according to claim 1, wherein the mounting portion further comprises a front panel, the receiving assembly is mounted between the front panel and the display panel.

3. The receiving device according to claim 1, wherein the receiving assembly further comprises a first bottom wall and at least one side wing connected with the first bottom wall, the first bottom wall is mounted on the front panel, and the side wing comprises a curved surface, the curved surface is matched with the front panel in shape, the curved surface is abutted against the front panel when the receiving assembly is mounted on the front panel.

4. The receiving device according to claim 1, wherein the receiving member comprises:
a first bottom wall, connected with the first connecting members; and
at least one first side wall, connected with the first bottom wall, the first bottom wall and the first side wall cooperatively define the storage space, the first bottom wall, the first connecting members, and the fixing assembly cooperatively define the mounting opening.

5. The receiving device according to claim 4, wherein the mounting portion further comprises a front panel, the connecting beam is arranged on the front panel; and
the receiving member further comprises at least one side wing connected with the first bottom wall, the side wing comprises a curved surface, the curved surface is matched with the front panel in shape, the curved surface is abutted against the front panel when the connecting beam is received in the mounting opening.

6. The shelf according to claim 4, wherein a quantity of the at least one first side wall is more than one,
an angle between one of the at least one first side wall and the first bottom wall is greater than 90°; and/or
one first side wall of the at least one first side wall is arc-shaped.

7. The receiving device according to claim 1, wherein the fixing assembly further comprises:
a retaining member, configured to retain against the connecting beam when the connecting beam is received in the mounting opening.

8. The shelf according to claim 1, wherein the fixing member further comprises:
a first storage box, connected with the second connecting members, the first storage box, the second connecting members, and the receiving assembly cooperatively define the mounting space, the first storage box defines at least one opening for placing objects in the first storage box or taking objects out of the first storage box.

9. The shelf according to claim 8, wherein the first storage box comprises:
a second side wall; and
a third side wall, connected with the second side wall, the second connecting members are connected with the second side wall and/or the third side wall, the second side wall defines a first opening for placing objects in the first storage box or taking objects out of the first storage box, the third side wall defines a second opening for placing objects in the first storage box.

10. The shelf according to claim 9, wherein the first storage box further comprises:
a second bottom wall, connected with the second side wall and the third side wall, the second bottom wall defines a third opening, the first opening is narrow and long, the first opening is configured to facilitate taking paper towels.

11. The shelf according to claim 10, wherein the first storage box further comprises:
a fourth side wall, connected between the third side wall and the second bottom wall.

12. The shelf according to claim 11, wherein
the fourth side wall defines a fourth opening communicated with the second opening; and/or
the first storage box further comprises at least one fifth side wall, the fifth side wall is connected between the third side wall, the second bottom wall, and the fourth side wall; and/or
the second bottom wall is protruded with at least one reinforcing rib; and/or
the second bottom wall defines at lease one receiving groove, the first storage box further comprises at least one fourth magnetic member received in the receiving groove, the fourth magnetic member is configured for magnetically adsorbing an electronic device.

13. The shelf according to claim 9, wherein the first storage box further comprises:
a receiving cavity; and
a drawer, received in the receiving cavity in a drawable manner by the first opening.

14. The shelf according to claim 8, further comprising:
a second storage box, communicated with the first storage box, one side of the second storage box is rotatably connected with the first storage box, and another side of the second storage box is detachably connected with the first storage box.

15. The shelf according to claim 8, further comprising:
a second storage box, communicated with the first storage box and comprising a third bottom wall, the third bottom wall defines a fifth opening, the second storage box comprises a supporting element arranged on the third bottom wall, the supporting element is configured to support objects in the second storage box and divide the fifth opening into two sub-openings, the sub-openings is configured to facilitate taking wet tissues.

16. The receiving device according to claim 1, wherein the mounting portion comprises a front panel, and the connecting beam is connected with the front panel, wherein
the receiving assembly further comprises: a first bottom wall, and two side wings arranged on the first bottom wall and matched with the front panel in shape, the side wing comprises a curved surface, the curved surface is matched with the front panel in shape, when the receiving assembly is mounted on the mounting portion, the first bottom wall is mounted on the front panel, the curved surface is abutted against the front panel, and the connecting beam is fixed between free ends of the side wings; or
the receiving assembly further comprises: a first bottom wall, and two connecting members arranged on the first bottom wall, when the receiving assembly is mounted on the mounting portion, the first bottom wall is mounted on the front panel, the connecting beam is fixed and contacted between the connecting members; or the receiving assembly further comprises: a first bottom wall, two side wings arranged on the first bottom wall and matched with the front panel in shape, and two connecting members arranged on the first bottom wall, the side wing comprises a curved surface, the curved surface is matched with the front panel in shape, when the receiving assembly is mounted on the mounting portion, the first bottom wall is mounted on the front panel, the curved surface is abutted against the front panel, and the connecting beam is fixed and contacted between the connecting members.

17. A vehicle, comprising a mounting portion and a receiving device as recited in claim 1, the mounting portion further comprises a front panel, the connecting beam is connected with the front panel.

18. The receiving device according to claim 1, wherein the receiving assembly further comprises two first connecting members, two side wings, and two reinforcing members, each reinforcing member is connected with one corresponding connecting member and one corresponding side wing, when the receiving assembly is mounted on the mounting portion, the connecting beam is contacted between the connecting members, and the side wings are abutted against the front panel.

* * * * *